US008861811B2

(12) United States Patent
Fancourt et al.

(10) Patent No.: US 8,861,811 B2
(45) Date of Patent: Oct. 14, 2014

(54) SYSTEM AND METHOD FOR SEGMENTING M-MODE ULTRASOUND IMAGES SHOWING BLOOD VESSEL WALL MOTION OVER TIME

(75) Inventors: Craig Fancourt, Lawrenceville, NJ (US); Karim Azer, Livingston, NJ (US); Matthew Walker, III, New York, NY (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 1046 days.

(21) Appl. No.: 12/857,193

(22) Filed: Aug. 16, 2010

(65) Prior Publication Data

US 2011/0044522 A1     Feb. 24, 2011

Related U.S. Application Data

(60) Provisional application No. 61/235,092, filed on Aug. 19, 2009.

(51) Int. Cl.
| | | |
|---|---|---|
| *G06K 9/00* | (2006.01) | |
| *G06T 7/00* | (2006.01) | |
| *G06T 7/20* | (2006.01) | |

(52) U.S. Cl.
CPC .......... *G06T 7/2033* (2013.01); *G06K 2209/05* (2013.01); *G06T 2207/30104* (2013.01); *G06T 2207/10132* (2013.01)
USPC ...................................................... 382/128

(58) Field of Classification Search
USPC ....................................................... 382/128
See application file for complete search history.

(56) References Cited

U.S. PATENT DOCUMENTS

| | | | | |
|---|---|---|---|---|
| 7,425,199 | B2 * | 9/2008 | Hoctor et al. ................. | 600/485 |
| 8,298,143 | B2 * | 10/2012 | Kanai et al. .................... | 600/437 |
| 2005/0267365 | A1 * | 12/2005 | Sokulin et al. ................ | 600/437 |

OTHER PUBLICATIONS

Stoitsis et al. "A Modular Software System to Assist Interpretation of Medical Images—Application to Vascular Ultrasound Images" Instrumentation and Measurement, IEEE Transactions on, Issue Date: Dec. 2006.*
Berteilli et al.; "A Semi-Automatic System for Segmentation of Cardiac M-Mode Images,"; Pattern Analysis and Applications 2006,; vol. 9,; issue 4,; pp. 293-306.
Malpica et al.; "A Snake Model for Anatomic M-Mode Tracking Echocardiography,"; Proc. 3rd. Int. Symp. on Image and Signal Processing and Analysis; pp. 722-726, 2003.
Stadler et al.; "Comparison of B-Mode, M-Mode and Echo-Tracking Methods for Measurement of the Arterial Distension Waveform,"; Proc. 3rd. Int. Symp. on Image and Signal Waveform; Ultrasound in Medicine and Biology, 1997,; vol. 23,; No. 6,; pp. 879-887.
Fancourt et al.; "Segmentation of Arterial Vessel Wall Motion to Sub-Pixel Resolution using M-mode Ultrasound,"; 30th Annual International IEEE EMBS Conference Vancouver, British Columbia, Canada, Aug. 20-24, 2008; pp. 3138-3141.

* cited by examiner

*Primary Examiner* — Eliza Lam
(74) *Attorney, Agent, or Firm* — James L. McGinnis; Catherine D. Fitch

(57) ABSTRACT

The present invention uses a microprocessor, a memory storage device, and a segmentation program comprising a plurality of program modules containing computer-readable instructions that cause the microprocessor to measure the spatial offsets between all pairs of scans in an m-mode image of a blood vessel with a cross-correlation function, convert the spatial offsets to a relative wall motion waveform through a global optimization procedure, and then translate the relative wall motion waveform to an absolute wall motion waveform by interpolation over the m-mode image. The resulting detailed absolute wall distension waveform may be beneficially rendered (e.g., superimposed) on the m-mode ultrasound image for display (e.g., on a printer and/or video monitor) and diagnostic purposes, and has enormous potential for enhancing existing techniques for identifying and studying vascular biomarkers, such as vessel wall strain and compliance.

31 Claims, 17 Drawing Sheets

FIG. 2

| | | | | | | | | | | | | |
|---|---|---|---|---|---|---|---|---|---|---|---|---|
| 2732 | 2739 | 2730 | 2762 | 2741 | 2760 | 2742 | | | | | | |
| 2729 | 2711 | 2699 | 2739 | 2740 | 2734 | 2706 | | | | | | |
| 2824 | 2791 | 2787 | 2827 | 2810 | 2803 | 2787 | | | | | | |
| 2837 | 2798 | 2804 | 2860 | 2826 | 2811 | 2789 | | | | | | |
| 2848 | 2820 | 2802 | 2844 | 2860 | 2832 | 2816 | | | | | | |
| 2721 | 2696 | 2646 | 2665 | 2762 | 2723 | 2730 | | | | | | |
| 2582 | 2587 | 2557 | 2524 | 2642 | 2604 | 2625 | | | | | | |
| 2541 | 2577 | 2564 | 2493 | 2581 | 2526 | 2557 | | | | | | |
| 2452 | 2394 | 2426 | 2372 | 2374 | 2389 | 2386 | | | | | | |
| 2342 | 2144 | 2224 | 2210 | 2254 | 2294 | 2207 | | | | | | |
| 2259 | 2071 | 2124 | 2145 | 2229 | 2251 | 2133 | | | | | | |
| 2170 | 2105 | 2141 | 2134 | 2170 | 2187 | 2164 | | | | | | |
| 2112 | 2188 | 2174 | 2142 | 2150 | 2155 | 2171 | | | | | | |
| 2151 | 2279 | 2209 | 2180 | 2218 | 2209 | 2171 | | | | | | |
| 2290 | 2235 | 2250 | 2206 | 2237 | 2295 | 2228 | | | | | | |
| 2435 | 2265 | 2318 | 2291 | 2294 | 2382 | 2350 | | | | | | |
| 2505 | 2459 | 2376 | 2407 | 2396 | 2443 | 2387 | | | | | | |
| 2503 | 2565 | 2358 | 2453 | 2428 | 2452 | 2368 | | | | | | |
| 2467 | 2474 | 2356 | 2411 | 2409 | 2469 | 2416 | | | | | | |
| 2548 | 2497 | 2571 | 2518 | 2495 | 2586 | 2614 | | | | | | |

SYSTEM AND METHOD FOR SEGMENTING M-MODE ULTRASOUND IMAGES SHOWING BLOOD VESSEL WALL MOTION OVER TIME

CROSS-REFERENCE TO RELATED APPLICATIONS

Not Applicable.

FIELD OF THE INVENTION

The present invention pertains to medical imaging. More particularly, it relates to systems and methods for analyzing and segmenting m-mode ultrasound images showing the movement of blood vessel walls over time.

RELATED ART

The mechanical state of a blood vessel at a given point and time can be well described using wall area, blood pressure and flow, and their control. A large artery wall, for example, is composed of three layers, namely the tunica intima, tunica media and tunica adventitia, each playing different roles in the function and dynamic response of the vessel wall to stresses. The artery wall is compliant and stretches in response to pressure. The average artery wall diameter may also change in response to its environment, a process known as remodeling. Both the compliance and the remodeling aspects of the blood vessel wall can change in short term regulation, long term regulation, or due to age or diseases such as hypertension or atherosclerosis. For example, the artery wall remodels to normalize fluid shear stresses. This regulation is important in mediating disease, as prolonged high shear stress can damage the endothelial layer, changing the diffusion rates of molecular exchange with the artery wall, giving rise to disease. The morphology of the absolute distension waveform describing the motion of boundaries within the walls of a blood vessel carries important vascular health information, especially when it is combined with flow or pressure measurements.

M-mode ultrasound is an experimental technique for very fast imaging along a single line, and is thus applicable to blood wall motion imaging. An ultrasonic beam transverse to the vessel wall is formed, by either mechanical or electronic beam forming, a pulse sent out, and the echo returns recorded. Each pulse (or an average of several successive pulses) produces echoes that are analyzed to produce a linear column of an "image" depicting the location of layers within the tissues through which the pulses travel and are reflected back to the recorder, at the time each pulse is sent out and the echo return recorded. These linear columns of the image (called "scans") are collected by the ultrasound machine and stored in an m-mode image data file and/or cumulatively displayed or printed side-by-side along a time axis on a video display device (e.g., a video monitor) or printer. Thus, an m-mode ultrasound "image" is technically a collection of sequentially-recorded ultrasound scans that cumulatively show the movement, along the scan line, of the tissues being examined over a period of time.

The process of sending out pulses and recording the echo returns is repeated at the pulse repetition frequency (PRF). Because only a single direction is probed, the PRF can be very fast, limited only by the time required for the pulse to reach the depth of interest and return. The fast PRF, in turn, provides a detailed picture of motion. A fast PRF is particularly important when imaging small animals whose heart rates are typically many times faster than that of humans.

For a number of technical reasons, accurately and reliably identifying, mapping and displaying the absolute waveform corresponding to the location and movement of the intima-lumen boundary in an m-mode ultrasound image of a blood vessel remains a significant and difficult challenge using conventional systems and techniques. Ultrasound energy is reflected by changes in the transmissive properties of the medium. Therefore, the boundaries involving the media and adventitia result in larger returns than those from the intima-lumen boundary. Moreover, wall echoes exhibit a banding structure with decreasing energy closer to the lumen and multiple reflections between the layers or walls can create false echoes in later pulses.

Various systems and techniques for segmenting the intima-lumen boundary have been proposed and used with limited success. Some of the proposed methods and techniques use grayscale m-mode signals, as opposed to radio-frequency (RF) signals, and some involve cardiac imaging. But many of the conventional systems and techniques have significant shortcomings. Berteilli et al., "A Semi-Automatic System For Segmentation Of Cardiac M-Mode Images," *Pattern Analysis and Applications*, 2006; vol: 9 iss: 4 pp: 293-306, for instance, discloses using various classifiers, such as neural networks, naïve Bayesian classifiers and hidden Markov models to classify each cardiac m-mode pixel as either inside or outside of the heart, using intensity and distance from the image edge. Prior to using this technique, however, the classifiers must be trained on manually-segmented images.

Malpica et al. "A Snake Model For Anatomic M-Mode Tracking In Echocardiography," Proc. 3rd Int. Symp. on Image and Signal Processing and Analysis, pp. 722-726, 2003, discloses fitting snakes to the contour edge in cardiac m-mode images. The snake is fit using an image registration method and optical flow to estimate the relative wall movement from one scan to the next, with regularization based on smoothness constraints. However, by using only local information, the method is not robust in extended regions of weak returns.

Stadler et al. "Comparison Of B-Mode, M-Mode And Echo-Tracking Methods For Measurement Of The Arterial Distension Waveform," *Ultrasound in Medicine and Biology*, 1997; 23: 879-887, discloses using edge detection combined with Fourier analysis and cubic spline smoothing to extract arterial wall distension waveforms. However, this method typically results in a reduced, and therefore misleading, estimate of wall distension.

Accordingly, a more robust and reliable system and method for segmenting m-mode ultrasound images of blood vessels to accurately identify the absolute wall motion waveforms of the intima-lumen boundaries of the vessels is needed.

SUMMARY OF THE INVENTION

As will be described in more detail below, aspects and embodiments of the present invention address the above-described need, and avoid the deficiencies and shortcomings associated with known systems and methods for segmenting m-mode ultrasound images showing the motion of blood vessel walls. Although venous blood vessels do not pulsate like arterial vessels, and do not reveal as much about the heart, the present invention may be used to determine absolute wall motion associated with both arteries and veins.

In general, systems and methods according to the present invention receive an m-mode ultrasound data file created by an ultrasound machine, store the m-mode data file on a computer-readable memory storage device and parse the data file according to a predefined m-mode data file format specification in order to produce a two-dimensional (2-D) m-mode matrix. A cross-correlation function is then applied to all pairs of scans in the 2-D m-mode matrix in order to calculate and produce a relative wall motion waveform. The cross-correlation function, which naturally exploits the banding structure typically characterizing such m-mode images, includes a global optimization procedure that enables higher resolution of the relative wall motion waveform. Then an absolute offset for the relative wall motion is calculated by interpolating the relative wall motion waveform over the 2-D m-mode matrix, and comparing the interpolated relative wall motion waveform to an established noise threshold. Ultimately, the system and method achieves segmentation of m-mode ultrasound images of blood vessels to sub-pixel resolution. Since the process is completely automated, it is more reliable than existing manual techniques.

Consistent with the foregoing general description, and in accordance with the invention as broadly described herein, one embodiment of the invention provides a computer system for segmenting an m-mode image of a moving blood vessel. The computer system includes a microprocessor, a computer-readable memory storage device, and a segmentation program comprising a plurality of program modules, encoded on the memory storage device, which control the operation of the microprocessor. The plurality of program modules includes a matrix generator, a matrix splitter, a scan correlator, a relative waveform calculator, and an absolute offset calculator. A prerecorded m-mode data file created on an ultrasound machine, comprising pixel intensity values for a collection of sequentially-recorded ultrasound scans of the blood vessel, is received and stored on the memory storage device of the computer system, each scan indicating the positions of boundaries within the blood vessel at the time the scan was recorded, including boundaries associated with an anterior wall of the blood vessel and boundaries associated with a posterior wall of the blood vessel.

The matrix generator program module contains computer-readable instructions that, when processed by the microprocessor, cause the microprocessor to generate and store on the memory storage device a 2-D array (or other suitable data structure) configured for storing a 2-D m-mode matrix comprising the pixel intensity values from the m-mode data file. In cases where the prerecorded m-mode data file produced by the ultrasound machine uses a special or non-standard format, the matrix generator may be adapted to include data and/or instructions to cause the microprocessor to parse the prerecorded m-mode data file according to the special format. Typically, the specification for the file format of the prerecorded m-mode data file may be obtained from the manufacturer of the ultrasound machine that produced the prerecorded m-mode date file. Preferably, the specification is recorded in a computer-readable data file, which is also stored on the memory storage device of the computer system and accessible to the segmentation program and the microprocessor.

The matrix splitter program module includes computer-readable instructions that cause the microprocessor to generate and store on the memory storage device an anterior wall region sub matrix comprising the portion of the 2-D m-mode matrix containing the anterior wall boundaries, and a posterior wall region sub matrix comprising the portion of the two-dimensional m-mode matrix containing the posterior wall boundaries. The resulting two region sub matrices will be segmented separately by the other program modules, and then optionally combined into one image depicting the absolute wall motion wave forms for both the anterior and posterior boundaries in the 2-D m-mode matrix.

The scan correlator program module measures the offsets between all pairs of scans in the two region sub matrices. In particular, the scan correlator module includes computer-readable instructions that cause the microprocessor to first select one of the two region sub matrices for segmentation, and then produce and store on the memory storage device a displacement matrix for the selected region sub matrix. As will be described in more detail below, the scan correlator program module causes the microprocessor to generate the displacement matrix by executing a globally-optimized cross-correlation function on all pairs of scans in the selected region sub matrix, and then calculate the relative offset between all of those pairs of scans as an index to the peak of the executed cross-correlation function.

The relative waveform calculator program module contains instructions that cause the microprocessor to calculate and store on the memory storage device a relative wall motion waveform for an intima-lumen boundary in the selected region sub matrix based on the displacement matrix produced by the scan correlator program module. In some embodiments, the plurality of program modules also includes an offset error detector program module, which contains computer-readable instructions that cause the microprocessor to automatically detect outlier regions in the displacement matrix, an outlier region having a boundary containing pixel intensity values that are inconsistent with the rest of the displacement matrix according to a specified inconsistency criteria, and to create and store in the memory storage device a weight matrix containing values that identify the outlier regions in the displacement matrix. In this case, the relative waveform calculator program module is further configured to calculate the relative wall motion waveform for the intima-lumen boundary based on both the displacement matrix and the weight matrix.

The absolute offset calculator program module calculates and stores on the memory storage device an absolute offset based on the relative wall motion waveform. Preferably, this is accomplished through the use of two other program modules; namely, an interpolator module and a threshold calculator module, both of which are also encoded on the memory storage device. An m-mode image or matrix has four edges: two in the spatial direction, and two in the temporal (or scan) direction. The interpolator module comprises computer-readable instructions that, when processed by the microprocessor, cause the microprocessor to automatically produce a mean interpolated relative wall motion waveform by interpolating the relative wall motion waveform over the selected region sub matrix as a function of a plurality of absolute offsets in the spatial direction from an edge of the selected sub matrix. The threshold calculator module has computer-readable instructions that cause the microprocessor to automatically select a threshold mean intensity value from a set of mean intensity values in the 2-D m-mode matrix. The set of mean intensity values are typically derived by performing a statistical analysis on the low intensity values in the 2-D m-mode matrix. Once the interpolated relative wall motion waveform and the threshold mean intensity value are known, the absolute offset calculator program module causes the microprocessor to automatically set the absolute offset equal to their intercept.

The computer system optionally includes an image generator program module that causes the microprocessor to produce and store on the memory storage device a segmented m-mode image illustrating the absolute wall motion waveform for the intima-lumen boundary, the segmented image comprising a graphical illustration of the relative wall motion waveform superimposed over a graphical illustration of the selected region sub matrix. Importantly, the relative wall motion waveform graphical illustration is positioned at a location in the segmented m-mode image that is shifted (i.e., offset) from an edge of the selected region sub matrix graphical illustration by an amount equal to the absolute offset calculated by the absolute offset calculator. The resulting segmented m-mode image may then be rendered into human-readable form and sent to an output device, such as a display monitor or printer, or otherwise transmitted over a network interface to another computer system or workstation for diagnostic purposes and/or further processing.

In accordance with another embodiment of the present invention, there is provided a computer-implemented method for segmenting an m-mode image of a blood vessel using a microprocessor, a computer-readable memory storage device, and a segmentation program comprising a plurality of program modules for controlling the operation of the microprocessor. The computer-implemented method comprises the steps of:

(A) storing a prerecorded m-mode data file on the memory storage device, the prerecorded m-mode data file comprising pixel intensity values for a collection of sequentially-recorded ultrasound scans of the blood vessel, each scan indicating the positions of boundaries within the blood vessel at the time said each scan was recorded, including boundaries associated with an anterior wall of said blood vessel and boundaries associated with a posterior wall of said blood vessel;

(B) using the segmentation program to cause the microprocessor to generate and store on the memory storage device a 2-D m-mode matrix comprising the pixel intensity values, wherein the segmentation program includes a program module having computer-readable instructions configured to cause the microprocessor to parse the prerecorded m-mode data file according to a predefined file format specification;

(C) using the segmentation program to cause the microprocessor to produce and store on the memory storage device an anterior wall region sub matrix and a posterior wall region sub matrix, the anterior wall region sub matrix comprising a portion of the 2-D m-mode matrix containing the boundaries associated with the anterior wall, and the posterior wall region sub matrix comprising a portion of the 2-D m-mode matrix containing the boundaries associated with the posterior wall;

(D) using the segmentation program and the microprocessor to automatically select one of the region sub matrices for segmentation;

(E) using the segmentation program to cause the microprocessor to produce and store on the memory storage device a displacement matrix for the selected region sub matrix, wherein said segmentation program includes a program module having computer-readable instructions to cause the microprocessor to execute a cross-correlation function on all pairs of scans in the selected region sub matrix and calculate the relative offset between said all pairs of scans as an index to a peak of the executed cross-correlation function;

(F) using the segmentation program to cause the microprocessor to calculate and store on the memory storage device a relative wall motion waveform for an intima-lumen boundary in the selected region sub matrix based on the displacement matrix; and (G) using the segmentation program to cause the microprocessor to calculate and store on the memory storage device an absolute offset based on the relative wall motion waveform.

In some embodiments, the method further includes using the segmentation program to cause the microprocessor to produce and store on the memory storage device a segmented m-mode image illustrating an absolute wall motion waveform for the intima-lumen boundary. The segmented m-mode image includes a graphical illustration of the relative wall motion waveform superimposed on a graphical illustration of the 2-D m-mode matrix or the selected region sub matrix. But the relative wall motion waveform graphical illustration is positioned at a location that is shifted in the spatial direction from an edge of the 2-D m-mode matrix graphical illustration or the edge of the selected region sub matrix illustration by an amount equal to the absolute offset. Typically, the shifted relative wall motion waveform corresponds to the absolute position and motion of the intima-lumen boundary of the anterior wall of the blood vessel.

In some embodiments, the method further includes using the segmentation program, the microprocessor and the memory storage device to produce a human-readable version of the segmented m-mode image on an output device, such as a display monitor or a printer.

In some embodiments, the method further includes using the segmentation program and the microprocessor to automatically select another one of said region sub matrices for segmentation, and repeating steps E through G above to produce and store on the memory storage device a second relative wall motion waveform for a second intima-lumen boundary, and a second absolute offset for the second relative wall motion waveform. In this case, the method also includes using the segmentation program and the microprocessor to produce a second segmented m-mode image, the second segmented m-mode image illustrating a second absolute wall motion waveform for the second intima-lumen boundary. The second segmented m-mode image comprises a graphical illustration of the second relative wall motion waveform superimposed on the graphical illustration of the two-dimensional m-mode matrix, and wherein the second relative wall motion waveform is positioned at a location that is offset from an edge of the two-dimensional matrix graphical illustration by an amount equal to the second absolute offset. Typically, the second intima-lumen boundary, the second relative wall motion waveform and the second absolute offset together describe the position and motion of the intima-lumen boundary of the posterior wall of the blood vessel. It should be understood, however, that the segmentation program may also be configured, in some embodiments, to segment the posterior region sub matrix first, and then segment the anterior region sub matrix second.

The method may further include using the segmentation program and the microprocessor to automatically generate and store on the memory storage device a weight matrix for the selected region sub matrix by automatically detecting outlier regions in the displacement matrix, the outlier regions each having one or more boundaries containing pixel intensity values that are inconsistent with the rest of the displacement matrix according to a specified inconsistency criteria, and to calculate the relative wall motion waveform based on both the displacement matrix and said weight matrix. The specified inconsistency criteria may comprise, for example, a difference of greater than one pixel between the offset values of two neighboring cells in the displacement matrix.

In some embodiments, the method further includes using the segmentation program and the microprocessor to automatically produce a mean interpolated waveform by automatically interpolating the relative wall motion waveform over the selected region sub matrix as a function of a plurality of absolute offsets in the spatial direction from an edge of the selected region sub matrix, selecting a threshold mean intensity value from a set of mean intensity values in the two-dimensional m-mode matrix, comparing the selected threshold mean intensity value and the mean interpolated waveform, and setting the absolute offset equal to the intercept of the selected threshold mean intensity value and the mean interpolated waveform. In this case, the set of mean intensity values is derived from a statistical analysis of low intensity values in the two-dimensional m-mode matrix.

In certain embodiments, the method further includes using the segmentation program and the microprocessor to automatically calculate and store on the memory storage device a distension for the blood vessel walls. Thus, the segmentation program may include a program module having computer-readable instructions to cause the microprocessor to (i) calculate a diastolic diameter based on a minimum separation between an absolute wall motion waveform for the anterior wall intima-lumen boundary and an absolute wall motion waveform for the posterior wall intima-lumen boundary, (ii) calculate a systolic diameter based on a maximum separation between the anterior wall absolute wall motion waveform and the posterior wall absolute wall motion waveform, and (iii) subtract the diastolic diameter from the systolic diameter. In this case, the method would typically also include using the segmentation program and the microprocessor to superimpose on the segmented image a set of markers indicating the diastolic diameter and the systolic diameter.

Another aspect of the present invention provides a computer program product, comprising a computer usable medium having computer-readable program code embodied therein, said computer-readable program code adapted to be executed by a microprocessor to implement the methods, as described herein, for segmenting an m-mode ultrasound image of a blood vessel using a microprocessor and a computer-readable storage device. The computer usable medium may comprise any computer-readable medium suitable for storing, carrying, fixing and/or transferring computer programs, software code, instructions, software images, modules and shared libraries, or data files, data structures and information associated with such programs, instructions, images, libraries, files and data structures, including but not limited to, memory, hard disks, DVD-ROMs, CD-ROMS, floppy disks, magnetic tape, flash memory cards, firmware or microcode in one or more sets of ROM, RAM or PROM chips, as an Application Specific Integrated Circuit (ASIC).

The increased resolution of the segmented m-mode images provided by embodiments of the present invention will improve existing techniques for identifying and analyzing hemodynamic biomarkers, such as distension, strain, and compliance, and enable development of completely new techniques and new biomarkers based on the information derived from exploiting the fine structure of the enriched wall motion waveform shape. Although exemplary embodiments of the invention, as described below, focus on blood imaging, the systems and methods described and claimed should be equally applicable to echocardiography.

BRIEF DESCRIPTION OF THE DRAWINGS

The present invention and various aspects, features and advantages thereof are explained in detail below with reference to exemplary and therefore non-limiting embodiments and with the aid of the drawings, which constitute a part of this specification and include depictions of the exemplary embodiments. In these drawings:

FIG. 2 illustrates the first 256 scans (time index) and the first 256 rows (distance index) of an exemplary 2-D m-mode matrix created by the microprocessor under the control of one more program modules in the segmentation program.

DETAILED DESCRIPTION OF EXEMPLARY EMBODIMENTS

Exemplary embodiments of the invention will now be described in more detail with reference to the figures. First, there is provided a detailed discussion of the computational elements and mathematical equations encompassed by computer programs (e.g., software) adapted to operate according to exemplary embodiments of the invention, followed by a detailed description of some of the hardware components and program flows that may be incorporated into such exemplary embodiments.

Computational Elements and Mathematical Equations Encompassed by the Segmentation Program The computer system of the present invention is preprogrammed with a plurality of program modules (collectively referred to herein as the "segmentation program") having computer-readable instructions adapted to cause the microprocessor to apply a series of mathematical calculations to the pixel intensity data in the scans of an m-mode data matrix, as described below, to achieve the practical result of producing both a relative wall motion waveform for the intima-lumen boundary in the two-dimensional m-mode matrix and an absolute offset for that relative wall motion waveform. The offset is measured in pixels from an edge of the two-dimensional m-mode matrix, thereby describing an absolute wall motion waveform. Thus, the series of mathematical equations applied to the pixel intensity data by the microprocessor are incorporated into the segmentation program, and more particularly, the program modules of the segmentation program. The program modules may be implemented in software, hardware, firmware or microcode, or some combination of software, hardware, firmware or microcode installed on the computer system. One or more modules in the segmentation program may also be configured, in some embodiments, to superimpose the absolute wall motion waveform (i.e., the relative wall motion waveform "shifted" by the absolute offset) on a depiction of the original m-mode ultrasound image.

An exemplary set of these mathematical equations will now be presented and discussed in detail. It should be noted, however, that these exemplary equations may be modified, adapted, limited, constrained or replaced by other mathematical equations, depending on the arrangement and formatting of the pixel data produced by the ultrasound device, as well as the level of resolution required, according to principles known by those skilled in the art, to achieve the objects of the invention without departing from the scope of the invention.

Figure 1:
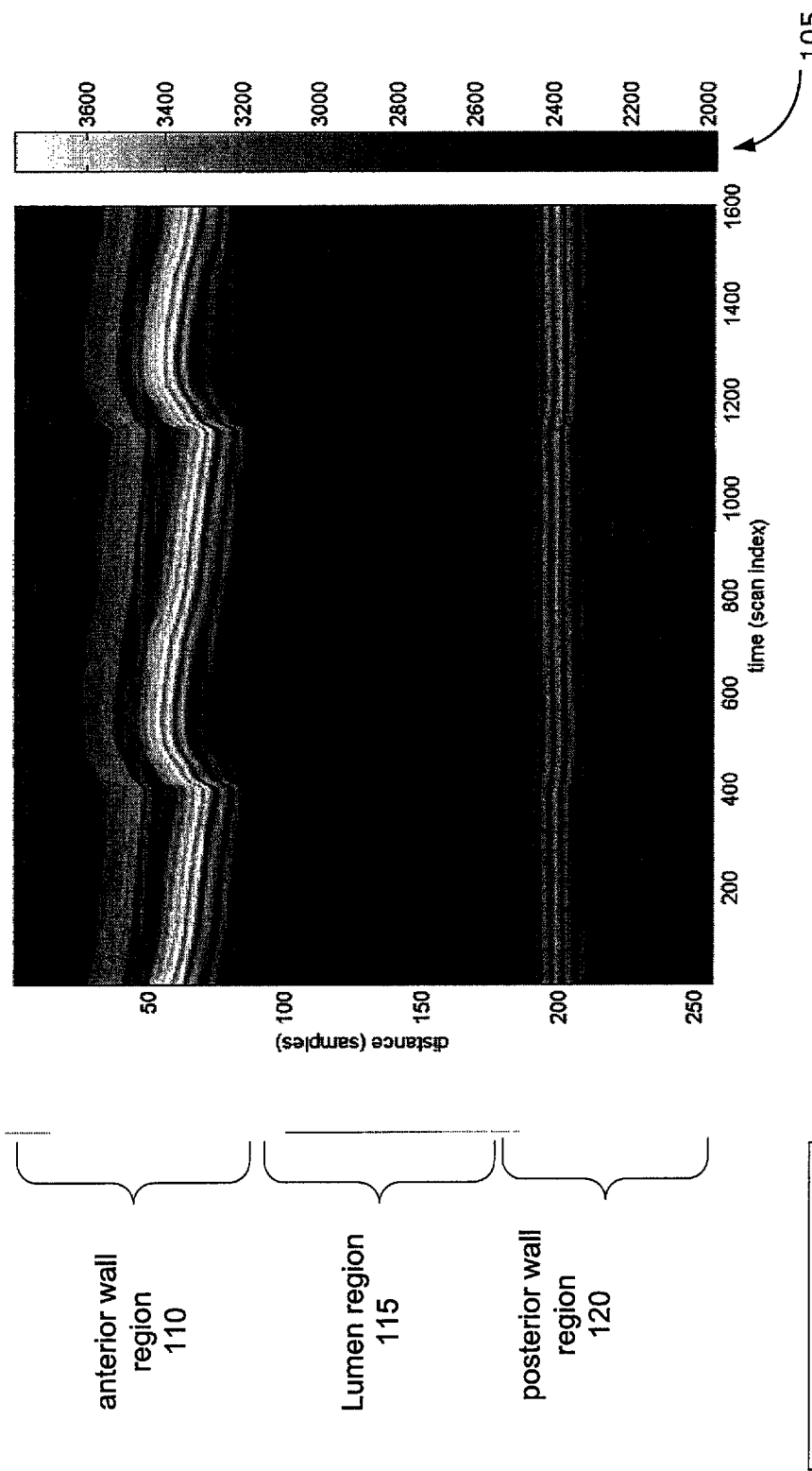
FIG. 1 shows an m-mode ultrasound image of the abdominal artery of a rat, which was acquired using a VisualSonics Vevo 770 system, a PRF of 4 kHz, and a spatial resolution of 0.0125 mm/pixel.

FIG. 1 shows an example of m-mode ultrasound "image" 100 of an artery in the abdominal artery of a rat. The image 100 was acquired using a VisualSonics Vevo 770 system, a PRF of 4 kHz, and a spatial resolution of 0.0125 mm/pixel. As shown in FIG. 1, this particular m-mode image 100 shows a collection of 1600 consecutive scans acquired by the transducer element of an ultrasound machine (although the number of scans may vary). The m-mode image 100 is created by displaying the 1600 scans side-by-side along a horizontal axis marked to indicate the time (by scan index) that each one of the 1600 scans was recorded. Thus, each vertical line in m-mode image 100 represents one scan. The vertical axis in m-mode image 100 is marked to show an index proportional to the distance from the transducer, which, in this case, would have been positioned (figuratively speaking) at a point above the top of the image, such that the distance index from the transducer increases as one follows a scan from the top of the image towards the bottom. In this case, the index proportional to the distance runs from 0 to 250 units.

As shown in FIG. 1, the m-mode image 100 also contains what appears to the eye to be two sets of relatively brighter horizontal bands. The first set of "bright" horizontal bands, roughly located in the marked distances from about 25 to 85, show the regions where the ultrasonic beam produced by the transducer encountered relatively dense media constituting various layers and boundaries associated with the anterior wall of the artery. This region is identified in FIG. 1 as the anterior wall region 110. The second set of bright horizontal bands, roughly located in the marked distances from about 190 to 205, show the regions where the ultrasonic beam encountered the relatively denser media associated with the various layers and boundaries associated with the posterior wall of the artery. This region is identified in FIG. 1 as posterior wall region 120. The relatively darker horizontal bands in the center of m-mode image 100 indicate where the ultrasonic beam encountered the relatively light (less dense) media constituting the blood flowing through the lumen. This region is identified in FIG. 1 as lumen region 115.

Each one of the 1600 vertical scans in m-mode image 100 contains a multiplicity of vertically aligned pixels, each pixel having a grayscale echo intensity value (i.e., brightness amplitude) proportional to the relative density of the medium at a particular distance from the transducer. Brighter (i.e., higher amplitude) pixels indicate a denser medium at that particular distance in the scan, while darker (lower amplitude) pixels indicate a less dense medium at that particular distance.

Thus, every point location in the m-mode image can be described with the equation $X(k,n)$=amplitude, where k=sample index proportional to the scan distance, and n=time (scan number). Moreover, the m-mode image of FIG. 1 may be represented in a computer system by creating and storing in memory a two-dimensional matrix $X(k,n)$, where $x \geq 0$ is the grayscale echo intensity, k the sample index proportional to the scan distance, and n the pulse index proportional to the scan time. The matrix X has dimensions K×N, where K is the number of samples per scan, and N is the number of scans. The amplitude scale 105 of FIG. 1 shows the range of amplitudes (pixel grayscale echo intensity values) for all of the pixels shown in the m-mode image 100.

The segmentation program of the present invention embodies computer readable instructions that cause the microprocessor to: (1) create and store the two-dimensional matrix X on a memory storage device, such as a hard disk drive associated with the computer, based on the m-mode ultrasound data file, (2) split the 2-D matrix into an anterior region sub matrix and a posterior region sub matrix, and, for each of the two resulting sub matrices: (3) find the relative distance offset between all pairs of scans, (4) calculate the relative wall motion from the pairs of distance offsets, and (5) calculate the absolute wall motion by interpolating the relative wall motion over the image.

FIG. 2 illustrates the first 256 scans (time index) and the first 256 rows (distance index) of an exemplary 2-D m-mode matrix 200 created by the microprocessor under the control of one more program modules in the segmentation program, referred to as the 2-D matrix generator. For purposes of better illustration, a portion 205 of the matrix (the first 20 rows and 7 columns) has been enlarged to more clearly indicate some of the grayscale echo intensity values contained therein.

Dividing the Image into Anterior and Posterior Regions

Figure 3:
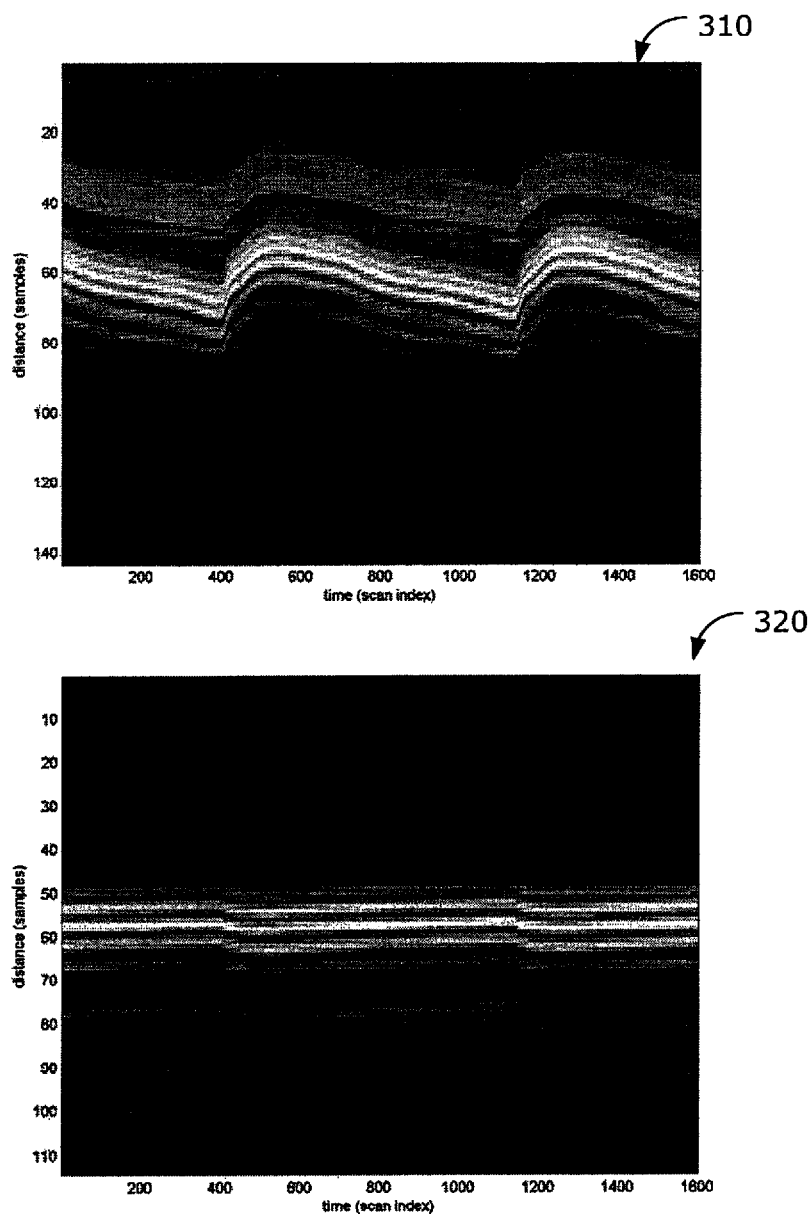
FIG. 3 illustrates, by way of example, images corresponding to data embodied in the two regional sub matrices created by the matrix splitter in certain embodiments of the present invention.

Since the lumen separates the anterior and posterior walls, finding the lumen center provides an effective segmentation. The lumen typically has the smallest magnitude return in each scan. Therefore, a min-max operation can be used: $k_{ctr}$=arg $\min_k[\max_n[X(k,n)]]$. In practice, the search is constrained to a region around the image center, K/2. Thus, the 2-D m-mode image of FIG. 2, containing 256 rows and 256 columns, may be split into two sub matrices in memory (not shown) having 128 rows and 256 columns. FIG. 3 illustrates by way of example what the two resulting sub matrices might look like to the eye if they were converted to image files and displayed on a display device, such as a video monitor. It is noted, however, that the systems and methods of the present invention do not require converting the sub matrices into displayable images or displaying them. As shown in FIG. 3, the anterior region sub matrix 310 includes the bright bands of pixels indicating boundaries associated with the anterior wall of the blood vessel, while the posterior region sub matrix 320 includes the bright bands of pixels associated with the posterior walls of the blood vessel. Then the segmentation program causes the microprocessor to apply the following segmentation procedures separately to each sub matrix.

Finding Pair-Wise Distance Offsets Between Scans

Within a temporal block of K scans, the computer-readable instructions in the segmentation program causes the microprocessor to measure the unbiased cross-correlation between all pairs of scans using the equation:

$$C(l, m, n) = \frac{1}{K - |l|} \sum_{k=1}^{K-|l|} [X(k, m) - \bar{x}(m)] \cdot [X(k + l, n) - \bar{x}(n)] \quad (1)$$

where $C(-l,m,n)=C(l,n,m)$, and $\bar{x}(n)$ is the $n^{th}$ scan mean:

$$\bar{x}(n) = \frac{1}{K} \sum_{k}^{K} X(k, n) \quad (2)$$

The segmentation program then finds the relative offset between the $m^{th}$ and $n^{th}$ scans as the index to the peak of the cross-correlation function using the equation:

$$\Delta D(m,n) = \arg\max_{|l| \le K/2}[C(l,m,n)] \quad (3)$$

Figure 4:
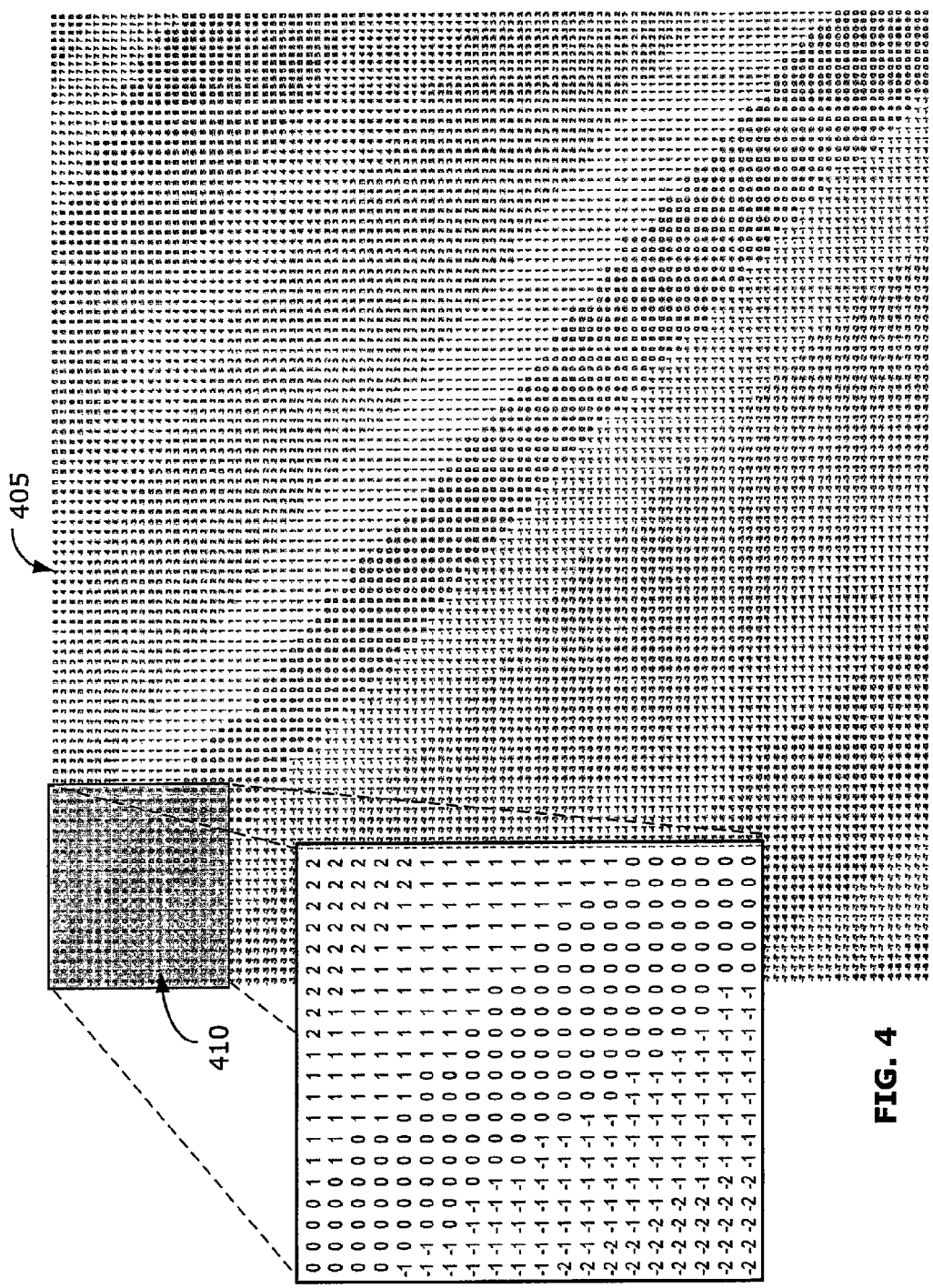
FIG. 4 shows an exemplary illustration of a displacement matrix according to the invention.

$\Delta D$ is the displacement matrix. Note that equation (1) implies that $\Delta D$ is an anti-symmetric matrix, and thus $\Delta D(m,n) = -\Delta D(n,m)$. Also, when $m=n$, $C(l,n,n)$ is an auto-correlation function, and thus $\Delta D(n,n)=0$. FIG. 4 shows an exemplary illustration of a displacement matrix 405 according to the invention. As shown in FIG. 4, the displacement matrix 405 comprises a 2-D matrix having a multiplicity of cells, wherein each cell contains a relative offset between the $m^{th}$ and $n^{th}$ scans as the index to the peak of the cross-correlation function. For purposes of better illustration, a portion 410 of the displacement matrix 405 (the first 20 rows and 20 columns) has been enlarged to more clearly indicate some of the relative offset values contained therein.

Improving the Displacement Matrix

The normalization factor in equation (1) is the number of samples used to calculate the cross-correlation, and produces an unbiased estimate. It has been observed that the unbiased version performs better than the biased version. However, the unbiased version effectively provides a larger weighting for estimates calculated from fewer samples, and which thus have a larger variance. For this reason, it is important to limit the range of offsets over which to search for the peak cross-correlation. We limit the search to K/2 in equation (3).

Figure 5:
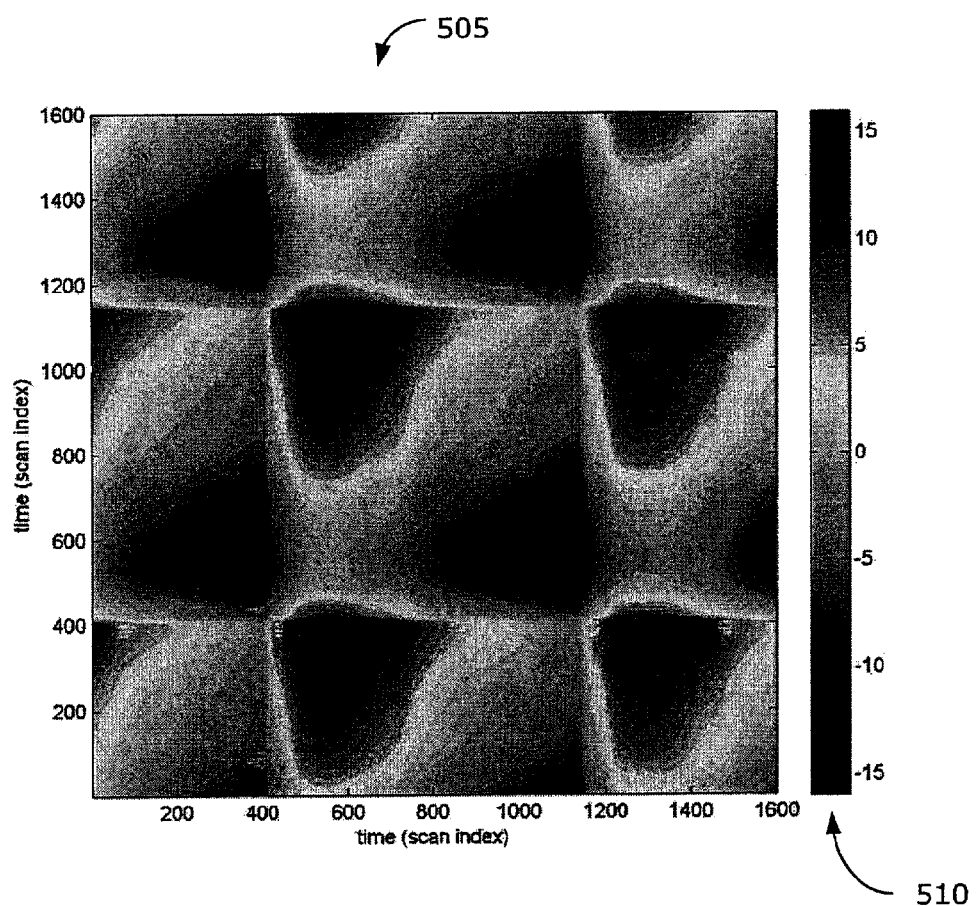
FIG. 5 shows an example of a "heat map" style illustration of an unfiltered anterior wall region displacement matrix.

In addition, the cross-correlation function peak is often broad, and the absolute maximum may lie at either end of this peak. This is most likely due to tissue compression caused by the stress of vessel expansion or respiration, which alters the spacing between tissue layers. This implies that smoothing the cross-correlation function is undesirable, and may actually cause errors in estimating the relative offsets. In spite of these precautions, however, errors can still appear in the displacement matrix. Visually, such errors appear as smoothness violations in the contours. FIG. 5 shows an example of a "heat map" style illustration of an unfiltered anterior wall region displacement matrix. A heat map is a graphical representation of data where the values taken by a variable in a two-dimensional map are represented as colors. In this case, grayscale toning is used to indicate the amplitude of the values at each location of the matrix. A scale 510 is provided to show how the grayscale tones are mapped to offset values in the matrix. As can be seen in FIG. 5, the darker regions represent comparatively large offsets, while the lighter regions represent smaller offsets.

Figure 6:
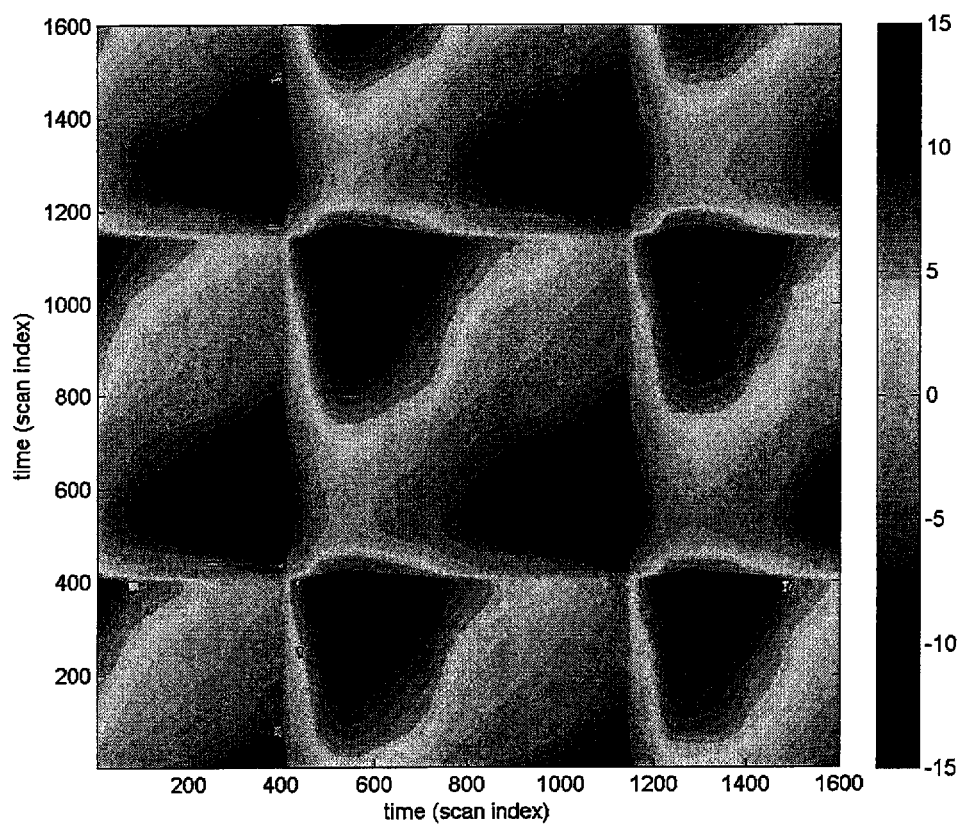
FIG. 6 shows the results of applying a median filter to a raw displacement matrix for the anterior region.

To remove the outliers, the segmentation program employs a two-step approach of median filtering followed by identification of suspicious contours. In order to remove isolated outliers while minimizing distortion, the segmentation program is configured to repeatedly filter the displacement matrix with a small (3×3) median filter, until no further changes are observed. This also has the effect of clustering spatially close errors into contiguous regions, allowing for easier identification and removal. For scans with a sufficiently fast PRF and sampling rate, there should be no steps greater than one between neighbors in the displacement matrix. The segmentation program uses this principle to identify outlier regions. First, all contiguous regions within the matrix are identified. Then the gradient along the perimeter (or boundary) of each contiguous region with its neighbors is evaluated. If the gradient indicates a step of more than one along more than ¼ of the perimeter's length, the contained region is labeled an outlier. As will be described below, the segmentation program preferably constrains the solution for the relative wall motion waveform to exclude these outliers. FIG. 6 shows, again in heat map style, the results of applying the median filter to the raw displacement matrix for the anterior region. Isolated outliers are removed, and the contours are mostly contiguous. Also shown are the detected outlier regions, the contours of which are identified by the black spots in the matrix.

Calculating Relative Wall Motion from Pairwise Distance Offsets

From the relative offsets between pairs of scans, the segmentation program next causes the microprocessor to calculate relative wall motion waveform. This is accomplished by first positing a wall distance variable, $d(n)$, and then forming an $l^2$-norm optimization criteria between all possible differences of the wall distance variable and the measured relative offsets of the displacement matrix using the equation:

$$J = \sum_{m=1}^{N} \sum_{n=1}^{N} W(m, n)[d(m) - d(n) - \Delta D(m, n)]^2 \quad (4)$$

where W is a weighting factor for the displacements. The program then minimizes equation (4) with respect to the wall distance variable using a function implementing the equation:

$$\frac{\partial J}{\partial d(k)} = 0 \Rightarrow \sum_{n=1}^{N} W(m, n)[d(m) - d(n) - \Delta D(m, n)] = 0 \quad (5)$$

By itself, equation (5) is ill-conditioned. However, with a constraint that the average wall motion is zero, the vector solution is:

$$d = (A_c^T A_c)^{-1} A_c^T b_c \quad (6)$$

$$A_c = \begin{pmatrix} A \\ 1^T \end{pmatrix}, A = \text{diag}[W \cdot 1] - W \quad (7)$$

$$b_c = \begin{pmatrix} b \\ 0 \end{pmatrix}, b = \text{diag}[\Delta D \cdot W] \quad (8)$$

where 1 is a vector of ones and "diag" is an operator that, when operating on a vector, produces a diagonal matrix, and when operating on a matrix, extracts the diagonal as a vector.

Equation (4) is the weighted mean squared error between all offsets of the calculated offset matrix, ΔD(m,m), and the offsets determined from the unknown relative wall motion waveform, d(m). The relative wall motion waveform is then determined by minimizing equation (4) with respect to the relative wall motion waveform, d(m), resulting in equation (5).

Equation (5) is a linear system of N equations in the N unknowns (the relative wall motion waveform entries, d(m)), where N is the number of scans. As such, equation (5) can be rearranged and represented in the standard matrix form A d=b, where A is a square matrix, and b is a vector, as described in equations (7) and (8), respectively. However, only N−1 of those equations are independent, meaning there is not a unique solution for the N vector relative wall motion waveform. Thus, the standard method for solving a linear system of equations, namely, inverting matrix A, cannot be used.

A solution is obtained by using an extra constraint. For example, since the average relative wall motion is zero, the following equation can be used:

$$\bar{d} = \frac{1}{N}\sum_{k}^{N} d(k) = 0$$

The addition of this constraint to the N equations represented by equation (5) results in N+1 equations in N unknowns. This set of N+1 equations in the N unknowns can still be represented in the matrix form $A_c d = b_c$. The standard method for solving such a set of equations is known as the Moore-Penrose, or psueo-inverse solution, resulting in equation (6).

The weighted solution allows the exclusion of contour outliers. The regions within those contours are given zero weight, and all other regions given unity weight. When all displacements have equal weight, W(m,n)=1, the solution to equation (6) is the mean of the displacement matrix columns:

$$d(m) = \frac{1}{N}\sum_{n=1}^{N} \Delta D(m, n) \tag{9}$$

Even though the displacements are measured to pixel resolution, the relative motion is the mean of a large number of such coarse measurements, resulting in a finer resolution.

Figure 7:
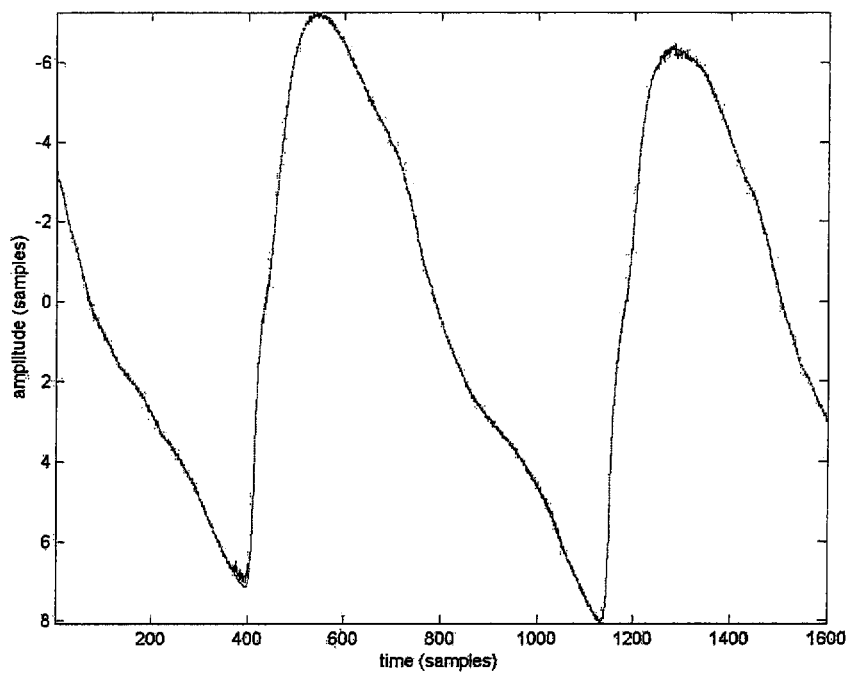
FIG. 7 shows an anterior relative wall motion waveform for a sample m-mode data file.

FIG. 7 shows the anterior relative wall motion waveforms for the sample m-mode. The uniformly weighted solution of equation (9), using the raw displacement matrix, is shown as a comparatively jagged line. The weighted solution (6), using the median filtered displacement matrices and contour outlier detection, is shown as a comparatively smooth line underneath the jagged line. The median filtering reduces the local variance of the waveform. Excluding contour outliers results in sharper transitions at both systole and diastole.

Calculating Absolute Wall Motion from Relative Wall Motion

At this point, the relative wall motion waveform is known, but its absolute offset within the image is not known. To determine it, the segmentation program causes the microprocessor to place the relative wall waveform on the m-mode image, and shifts it in the spatial dimension until it aligns with the intima-lumen boundary. This is accomplished by interpolating the relative wall motion waveform over varying offsets from the image edge, and then averaging over time. The absolute offset is then obtained by comparing the average values to a threshold based on noise statistics.

For example, a nearest neighbor interpolation over the m-mode image is calculated by employing instructions in the segmentation program to execute the following equation:

$$\tilde{x}(k) = \frac{1}{N}\sum_{n=1}^{N} X(\text{round}(d(n) + k), n) \tag{10}$$

This results in a pixel-level resolution in the absolute offset, k. Although other interpolation methods can be used which provide sub-pixel resolution, the segmentation program preferably uses the nearest neighbor interpolation to find the approximate boundary, and then a sub-sample linear interpolation to refine the estimate.

Next, the segmentation program causes the microprocessor to find the absolute offset from the image edge to the wall-lumen boundary from the shape or amplitude of $\tilde{x}(k)$. One approach is to choose the offset closest to the lumen such that $\tilde{x}(k)$ is greater than a threshold. A second approach is to choose the offset closest to the lumen such that $\tilde{x}(k)$ is a local maximum greater than a threshold. The threshold determines the placement of the relative waveform between the wall and the lumen. It is determined automatically from the statistics of the lumen region. Preferably, the segmentation program is configured to set the threshold to a high percentile of a histogram of lumen intensities, typically 99% or higher.

Figure 8:
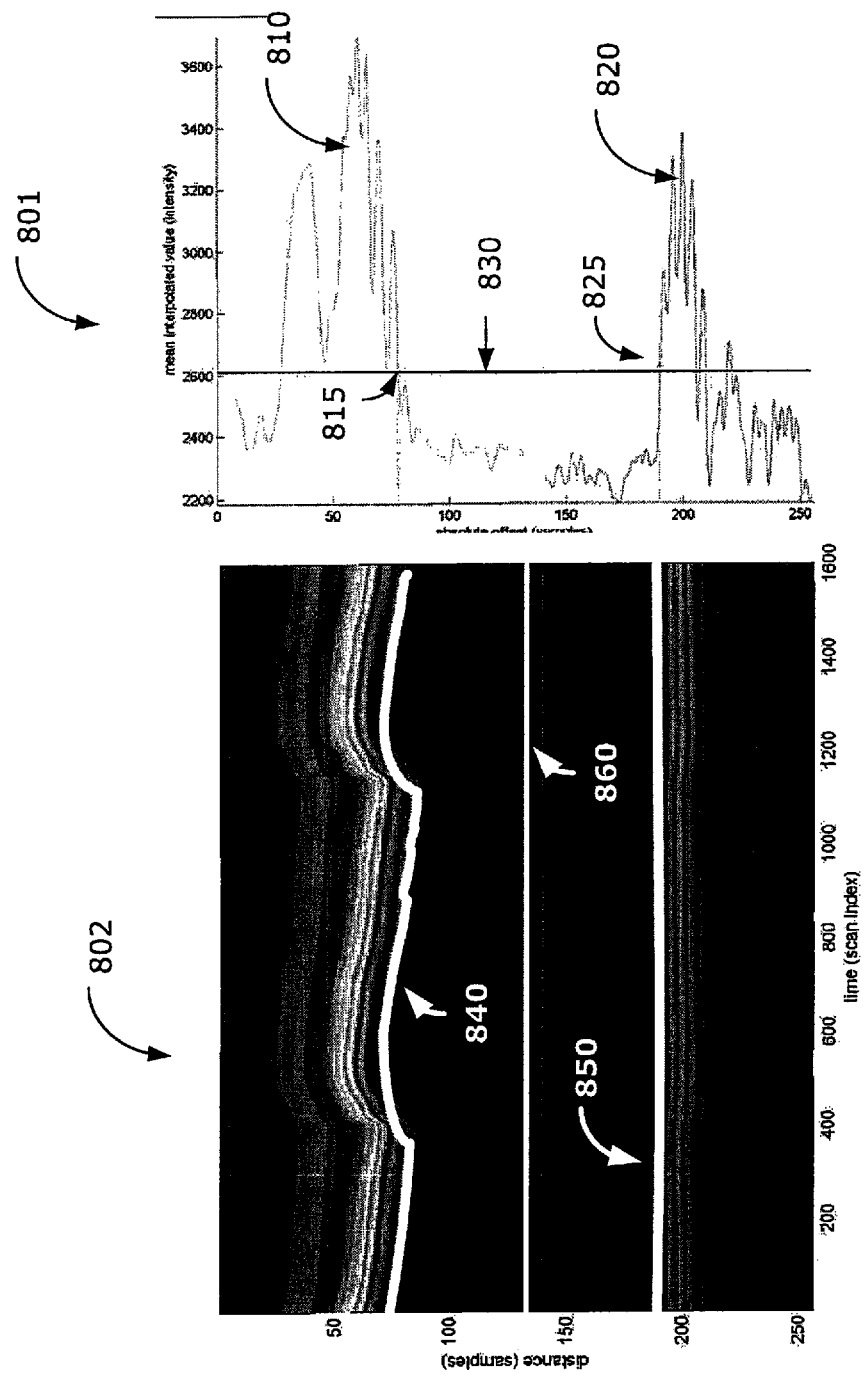
FIG. 8 shows the mean value of an anterior wall relative waveform and mean value of a posterior wall relative waveform, both interpolated over the m-mode image, as a function of offset from the image edge.

Graph 801 in FIG. 8 shows the mean value of the anterior wall relative waveform 810 and mean value of the posterior wall relative waveform (820), both interpolated over the m-mode image, as a function of a plurality of absolute offsets in the spatial direction from the image edge. Linear interpolation was used with a step size of 0.1 samples. Where these mean interpolated waveforms 810 and 820 intersect with a threshold 830 determines the absolute offsets. In this case, the threshold is at ~2600 lumen as measured from the lumen statistics on the m-mode image. Therefore, the anterior mean interpolated waveform 810 intersects threshold 830 at the point 815, and the posterior mean interpolated waveform 820 intersects the threshold 830 at the point marked by 825.

Graph 802 of FIG. 8 shows the final wall segmentation, including the anterior relative waveform 840, the posterior relative waveform 850, as well as the dividing line 860 between the two regions, all superimposed on the original m-mode image using the calculated absolute offsets. The relative waveforms are shifted from the top edge of the m-mode image by the number of pixels corresponding to the absolute offset, and are well aligned with the intima-lumen boundaries of the blood vessel, even in regions where the return magnitude is weak.

The posterior wall motion is expected to be the mirror image of the anterior wall motion. However, in practice they often have different shape and distension. This may be due to different mechanical stresses on the walls. Or it may be due to most of the ultrasonic acoustic energy being reflected at the anterior wall, leaving insufficient energy to accurately image the posterior wall. In this latter case, the calculated posterior wall motion is considered to be less reliable than that of the anterior wall motion, and determining its motion more accurately may be accomplished by reflecting the anterior wall waveform and superimposing it on the median of the absolute posterior wall waveform. The detailed steps to accomplish this are as follows: First, the anterior and posterior absolute wall motion waveforms are calculated in the standard way.

Second, the median position of the posterior absolute wall motion waveform is calculated. Finally, a new absolute posterior wall motion waveform is determined as the negative of the anterior relative wall motion waveform plus an offset, where the offset is calculated such that the new waveform has the same median position as the old.

The computational complexity of the computer-implemented instructions embodied in the segmentation program scales as $\propto K \cdot N^2$. For example, segmenting a 256×8000 image typically takes ~10 minutes for a 'c' program running on a 2.6 GHz dual Intel Xeon computer. In theory, it is possible to apply the algorithm to a long sequence of continuous m-mode scans. However, in practice, for varying reasons, it may be preferable to segment longer images in blocks.

For example, distortions caused by respiration can render a subset of m-mode scans unusable for determining the wall motion waveforms. In this case, the blocks are specifically chosen to avoid respiration distorted regions, and the wall motion waveforms of those blocks are calculated independent of their neighbors. Even when an entire m-mode file contains valid data, memory and computational limitations might make it more practical to segment the image in blocks. In some cases, it is still preferable to consider each block as independent of its neighbors. For example, treating each block independently allows an estimate of the variability of the entire process of estimating the wall motion waveforms. In other cases, it may be desireable to segment the image in blocks, and then piece together the resulting relative waveforms fragments into a single long continuous waveform. This is accomplished by choosing overlapping blocks, and aligning the relative wall motion waveforms by minimizing the mean squared error difference of the waveforms in the overlap region. The overlap region should include at least one cardiac cycle to avoid long-term drift. The resulting single continuous relative motion waveform is then converted to an absolute waveform in the usual way.

Figure 9:
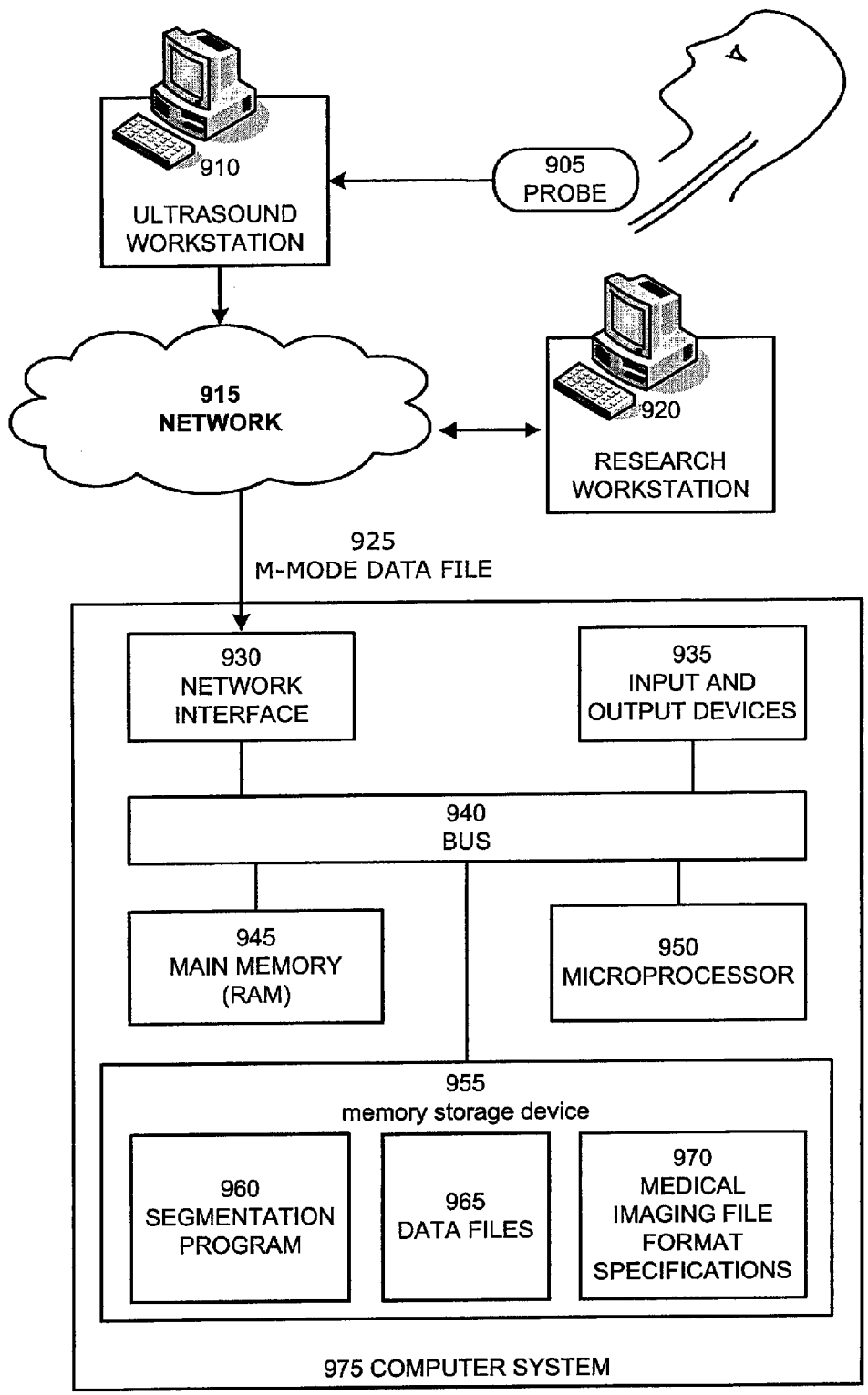
FIG. 9 shows an exemplary embodiment of a computer system configured to operate according to certain embodiments of the invention.

FIG. 9 shows an exemplary embodiment of a computer system 975 configured to operate according to certain embodiments of the invention. The invention may be implemented on a variety of computer systems, including personal computers, hand-held devices, multi-processor systems, minicomputers, mainframe computers, and the like. The invention may also be implemented in a distributed system, where tasks are performed by components that are linked through a communications network. In a distributed system, cooperating modules may be sited in both local and remote locations. As shown in FIG. 9, computer system 975 preferably includes a network interface 930, one or more input/output devices 935, a computer bus 940, main memory 945, one or more microprocessors 950, a memory storage device 955, and a segmentation program 960, encoded in memory storage device 955, along with data files 965 and medical image file format specifications 970.

Network interface 930 provides a point of interconnection between computer system 975 and a private or public network 915. Network interface 930 is generally a network interface card (NIC), but does not have to have a physical form. Instead, the network interface can be implemented in software. As shown in FIG. 9, network interface 930 is configured to receive an m-mode data file 925 transmitted via a local area or wide area network 915 from an ultrasound workstation 910 having a transducer 905 for recording ultrasound echo signals. In this case, the transducer is shown as it might be used near the carotid artery of a human subject or patient. It is understood, however, that the subject blood vessel may be a vessel of a different animal, such as a rat or monkey, as is commonly used for pre-clinical trials.

Computer bus 940, also known as the address bus, data bus, or local bus, is a data connection between two or more devices connected to the computer. For example, bus 940 enables the microprocessor 950 to communicate with the main memory 945, the memory storage device 955, the network interface 930 and the input/output devices 935. Input/Output devices 935 typically includes human interface devices, such as alphanumeric input devices, like keyboards and keypads, cursor control devices, like computer mice and touchpads, document output devices, like printers, and visual output devices, like video display monitors. It is noted, however, that input/output devices 935 may include any device for communication with other information processing systems, as well has humans. For example, input/output devices 935 may also comprise a communication link or interface by which computer system 950 sends and receives data to a separate or remote research workstation 920.

Microprocessor 950 comprises, for example, any general purpose microprocessor or CPU capable of executing binary or object code computer programming instructions, including the computer-readable instructions embodied in the segmentation program 960, as described above, as well as programs, modules and instructions embodied in and associated with a variety of installed computer operating systems for personal computer systems, servers and workstations. Suitable microprocessors include, for instance, x86-compatible CPUs, ARM architecture CPUs and PowerPC CPUs, while the most common operating systems for personal computers include, for example, Microsoft Windows®, Mac OS X® and Linux, all of which may be used or adapted for use with the current invention.

Memory storage device 955, which may also be referred to as "memory," or "storage," refers to any components, devices, and recording media associated with computer system 975 that retain digital data, including computer programs, used for computing or processing, for some interval of time. Although shown as a separate component in FIG. 9, memory storage device 955 may include main memory 945 (a form of semiconductor storage known as random access memory (RAM)), as well as any kind of mass storage device, including optical discs, forms of magnetic storage, like hard disks, and other types of memory considered slower than RAM. For purposes of the present invention, memory storage device 955 retains the segmentation program 960 (e.g., the object code readable by the microprocessor 950), the data files 965 (described below) and the medical imaging file format specifications described herein, and provides the storage medium by which microprocessor 950, operating under the control of segmentation program 960, retrieves and stores data concomitant to carrying out the mathematical operations and achieving the objects of the current invention. Although the ultrasound machine 910 is shown as a separate device from the computer system 975 in FIG. 9, it is understood that the ultrasound components may also be incorporated into the computer system 975, or the computer system 975 components may also be incorporated into the ultrasound machine 910, without departing from the intended scope of the invention as disclosed and claimed herein.

Figure 10:
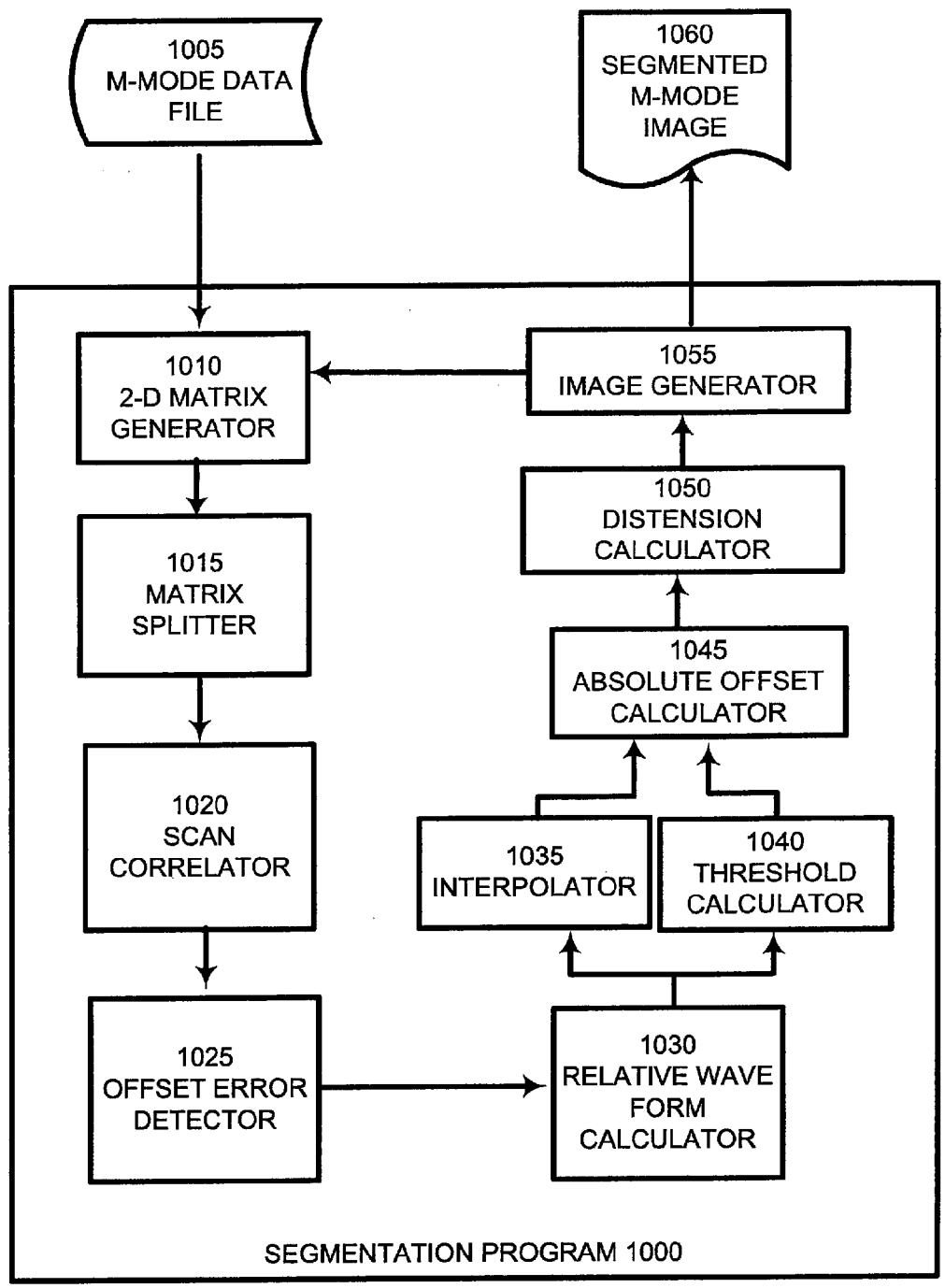
FIG. 10 provides an illustration of some of the program modules that make up some of the functional components of a segmentation program for certain embodiments of the current invention.

The segmentation program comprises a plurality of program modules having computer-readable instructions that cause the microprocessor 950 of FIG. 1 to carry out and/or execute the mathematical equations (1) through (9) described above to generate the waveforms, offsets and segmented images provided by the invention. FIG. 10 provides a more detailed illustration of the program modules in the segmentation program 1000 are arranged for certain embodiments of the current invention. In the exemplary embodiment depicted in FIG. 10, the program modules incorporated into segmentation program 1000 include 2-D matrix generator 1010, matrix splitter 1015, scan correlator 1020, offset error detector 1025, relative wave form calculator 1030, interpolator 1035, threshold calculator 1040, absolute offset calculator 1045, distension calculator 1050, and image generator 1055. It should be understood, however, that the exact number and arrangement of program modules comprising the segmentation program 1000, as herein described for purposes of illustration, is not critical. Those having skill in the art will recognize and appreciate, for example, that beneficial alternative embodiments may be arranged to use a fewer or greater number of individual program modules, or a fewer or greater number of segmentation programs, to accomplish substantially the same or similar functions as those herein described without departing from the intended scope of the invention.

Matrix generator 1010 comprises computer-readable instructions (i.e., program code) that cause the microprocessor to read and parse a prerecorded m-mode data file according to a predefined file format specification in order to generate and store on the memory storage device the 2-D m-mode matrix X(k,n) described above and depicted in FIG. 2. The predefined file format specifications may include specifications such as, for example, DICOM, ANALYZE and NEMA. The prerecorded m-mode data file typically comprises a binary file containing header and pixel data, that, when processed by a computer processor operating under the control of an m-mode image viewer software program, produces an image on a standard display device or printer that has an appearance substantially like the image shown in FIG. 1 (i.e., a sequentially-acquired collection of scans cumulatively displayed or printed side-by-side along a time axis). The prerecorded m-mode data file may be already stored on the computer system, or it may be received by the 2-D matrix generator 1010 directly from an ultrasound workstation via a network interface or other communication link associated with the computer system where 2-D matrix generator 1010 resides.

Matrix splitter 1015 comprises computer-readable instructions adapted to cause the microprocessor to generate and store on the memory storage device an anterior wall region sub matrix and a posterior wall region sub matrix. Exemplary images illustrating the data represented by the sub matrices are shown in FIG. 3. The anterior wall region sub matrix comprises the portion of the 2-D m-mode matrix containing the boundaries associated with the anterior wall of the subject blood vessel. The posterior wall region sub matrix comprises the portion of the 2-D m-mode matrix containing the boundaries associated with the posterior wall of the vessel.

Scan correlator 1020 includes computer-readable instructions that, when processed by the microprocessor, will cause the microprocessor to select one of the two region sub matrices for segmentation (using the other elements of the segmentation program, as described more fully below), and to produce and store on the memory storage device a displacement matrix $\Delta D(m,n)$ for the selected region sub matrix. The displacement matrix $\Delta D$, an illustration of which is shown in FIG. 4, is created by executing a cross-correlation function on all pairs of scans in the selected region sub matrix and calculating the relative offset between said all pairs of scans as an index to a peak of the executed cross-correlation function, as described more fully below and with respect to the flow diagrams depicted in FIGS. 14 and 15.

Offset error detector 1025 comprises computer-readable instructions to cause the microprocessor to automatically detect outlier regions in the displacement matrix $\Delta D$, and store on the memory storage device a weight matrix $W(m,n)$ containing values that identify the outlier regions in the displacement matrix. A region is considered an outlier region if its boundary contains pixel intensity values that are inconsistent with the rest of the displacement matrix $\Delta D$ according to a specified inconsistency criteria. The specified inconsistency criteria may comprise, for example, a difference greater than one pixel between the offset values of two neighboring cells in the displacement matrix $\Delta D$.

Relative waveform calculator 1030 comprises computer-readable instructions that will cause the microprocessor to calculate and store on the memory storage device a relative wall motion waveform for an intima-lumen boundary in the selected region sub-matrix based on the both the displacement matrix $\Delta D$ and the weight matrix W. More particularly, relative waveform calculator 1030 calculates the relative wall motion waveform by populating and executing equations (4) through (8), as described in detail above.

Interpolator 1035 comprises computer-readable instructions that, when processed by the microprocessor, will cause the microprocessor to automatically produce a mean interpolated waveform by interpolating the relative wall motion waveform over the selected region sub matrix as a function of a plurality of absolute offsets in the spatial direction from an edge of the selected sub matrix, as implemented in accordance with equation (10) above. Threshold calculator 1040 comprises computer-readable instructions to cause the microprocessor to automatically select a threshold mean intensity value from a set of mean intensity values in the 2-D m-mode matrix.

Absolute offset calculator 1045 comprises computer-readable instructions to cause the microprocessor to calculate and store on the memory storage device an absolute offset for the relative wall motion waveform by (1) comparing the selected threshold mean intensity value produced by the threshold calculator 1040 and the mean interpolated waveform produced by the interpolator 1035, and (2) setting the absolute offset equal to the intercept of the selected threshold mean intensity value and the mean interpolated waveform. In other words, the absolute offset is set to the value on the mean interpolated relative waveform where the mean interpolated relative waveform interests the threshold.

Distension calculator 1050 comprises computer-readable instructions that cause the microprocessor to automatically calculate and store on the memory storage device a distension for the blood vessel by (1) calculating a diastolic diameter based on a minimum separation between an absolute wall motion waveform for the anterior wall and an absolute wall motion waveform for said posterior wall, (2) calculating a systolic diameter based on a maximum separation between the anterior wall absolute wall motion waveform and the posterior wall absolute wall motion waveform, and (3) subtracting the diastolic diameter from said systolic diameter.

Finally, image generator 1055 comprises computer-readable instructions configured to cause the microprocessor to produce and store on the memory storage device a segmented m-mode image 1060 illustrating an absolute wall motion waveform for the intima-lumen boundary. The segmented m-mode image comprises a graphical illustration of the relative wall motion waveform superimposed on a graphical illustration of the selected region sub matrix. However, the relative wall motion waveform graphical illustration is positioned at a location that is shifted from the edge of the selected region sub matrix graphical illustration by an amount equal to the absolute offset.

Figure 11:
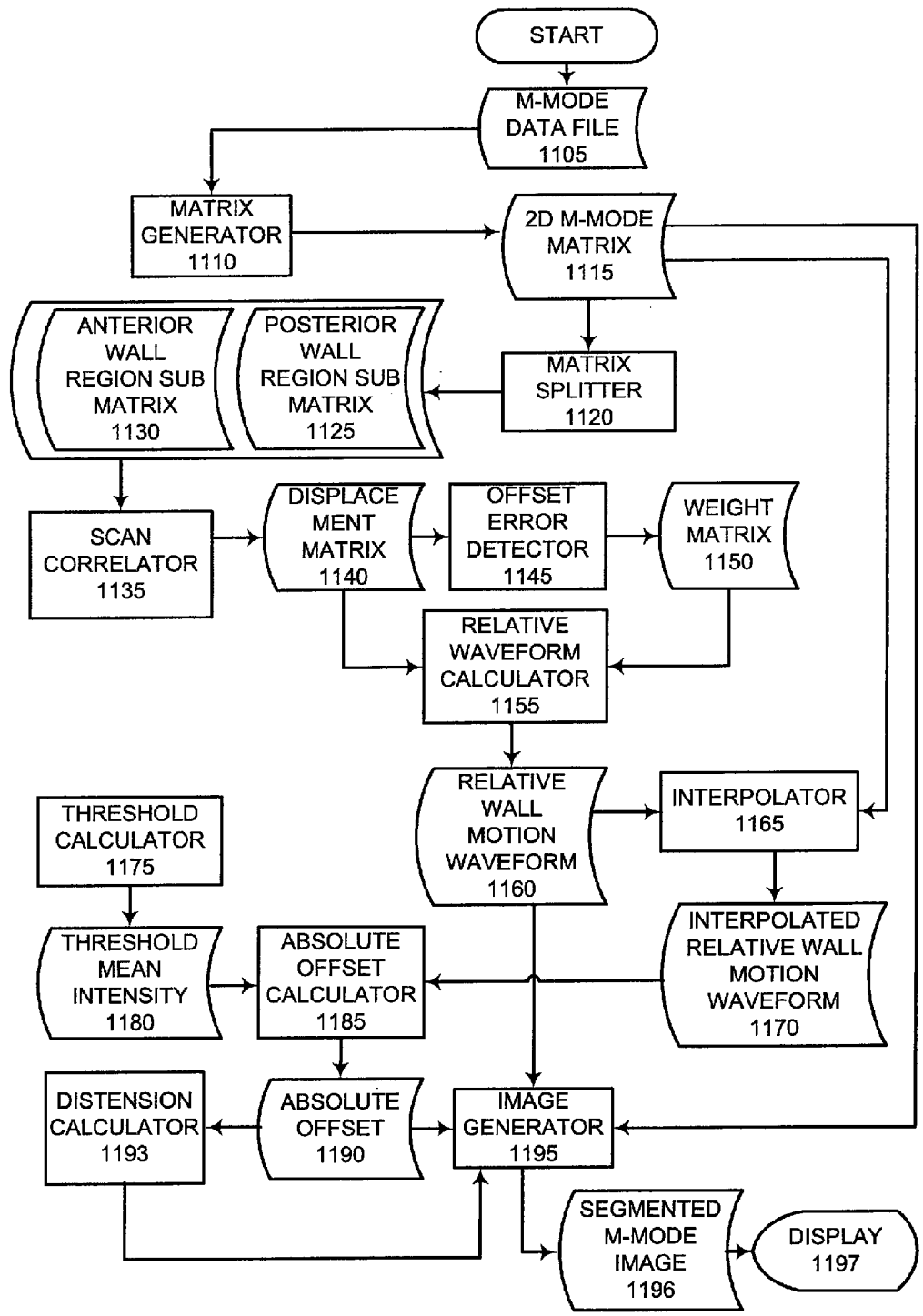
FIG. 11 shows a data flow diagram illustrating the overall data flow for a segmentation program configured to operate according to an exemplary embodiment of the present invention.

FIG. 11 shows a data flow diagram illustrating the overall data flow for a segmentation program configured to operate according to an exemplary embodiment of the present invention. First, a prerecorded m-mode data file 1105 is read and parsed by the matrix generator 1110, according to a predefined file format specification, to produce a 2-D m-mode matrix 1115 like the one shown in FIG. 2 and described in more detail above. Next, matrix splitter 1120 divides the 2-D m-mode matrix 1115 into an anterior wall region sub matrix 1130 and a posterior wall sub matrix 1125. Scan correlator 1135 selects one of the sub matrices for segmentation, and then produces a displacement matrix 1140 by executing the cross correlation equations (1)-(3) above, and in accordance with the exemplary flow diagrams shown in FIGS. 14 and 15. Next, offset error detector 1145 identifies the outliers in the displacement matrix 1140 to produce the weight matrix 1150.

Relative waveform calculator 1155 next calculates the relative wall motion waveform 1160, based on both the displacement matrix 1140 and the weight matrix 1150, using the equations (4)-(8) described above. Interpolator 1165 determines the interpolated relative wall motion waveform 1170 (i.e., the mean value of the relative wall motion wave form over the selected region sub matrix as a function of absolute offset from an image edge), while a separate module, the threshold calculator 1175, calculates the threshold mean intensity 1180 for the lumen region. Absolute offset calculator 1180 compares the threshold mean intensity 1185 to the interpolated relative wall motion waveform 1170 and sets the absolute offset 1190 at the point where the interpolated relative wall motion waveform intersects with the threshold. And finally, with the absolute offset thus calculated, image generator 1195 superimposes the relative wall motion waveform 1160 over an image representation of the selected region sub matrix, to produce a segmented m-mode image 1196, which is then displayed on display device 1197. An example of the segmented m-mode image 1196 is shown in FIG. 8. Optionally, distension calculator 1193 calculates the average distension over time for the blood vessel walls before the segmented m-mode image 1196 is displayed, and adds average distension markers to the segmented m-mode image 1196, as shown at 1705 and 1710 in FIG. 17.

Figure 12:
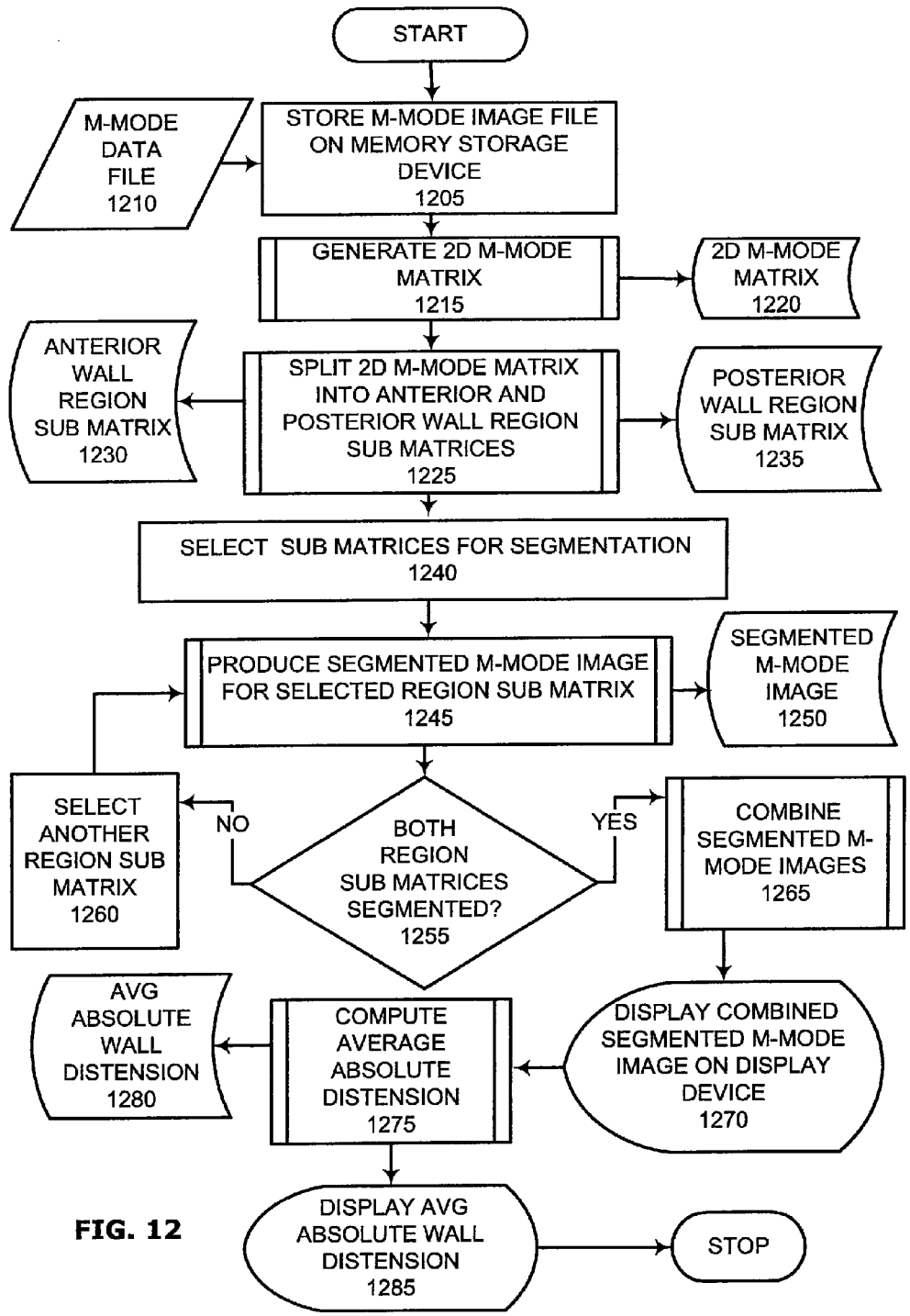
FIG. 12 shows a program flowchart illustrating the steps performed by exemplary embodiments of the segmentation program configured to operate according the principles of the present invention.

FIG. 12 shows a program flowchart illustrating the steps performed by exemplary embodiments of the segmentation program configured to operate according the principles of the present invention. As shown in FIG. 12, the segmentation program first stores an m-mode image file 1210 created by an ultrasound sensing device on a memory storage device, such as on a hard drive or in a random access memory area accessible to the program (step 1205). Then, at step 1215, the program generates a 2-D m-mode matrix 1220, like the example shown in FIG. 2, based on the m-mode data file 1210. At step 1225, the program splits the 2-D m-mode matrix into an anterior wall region sub matrix 1230 and a posterior wall region sub matrix 1235, and stores both of the sub matrices on the memory storage device. In step 1240, one of the two region sub matrices is selected for segmentation first, which is carried out in step 1245, according to the program flow shown in FIG. 13 and discussed in more detail below, to produce a segmented m-mode image 1250 for the selected region sub matrix. The region sub matrix not selected in step 1240 will be selected and segmented in a subsequent second pass, as indicated by steps 1255 and 1260 of FIG. 12.

If, at step 1255, the segmentation program determines that both region sub matrices have been processed to create segmented m-mode images, then the processing proceeds to step 1265, where the two segmented m-mode images (one for the anterior region and one for the posterior region) are optionally combined to create a single combined m-mode image for display on a display device 1270. But if it is determined in step 1255 that only one of the sub matrices has been segmented, then processing proceeds to step 1260, where the second sub matrix is selected for segmentation, before proceeding again to step 1245 for a second execution of the segmentation procedure, but using the second selected region sub matrix. Finally, in steps 1275 and 1285, respectively, the segmentation program of the present invention calculates the average absolute distension 1280 for the wall motion of the subject blood vessel and displays the distension data on the display device 1285, preferably superimposed over the original m-mode image for the blood vessel.

Figure 13:
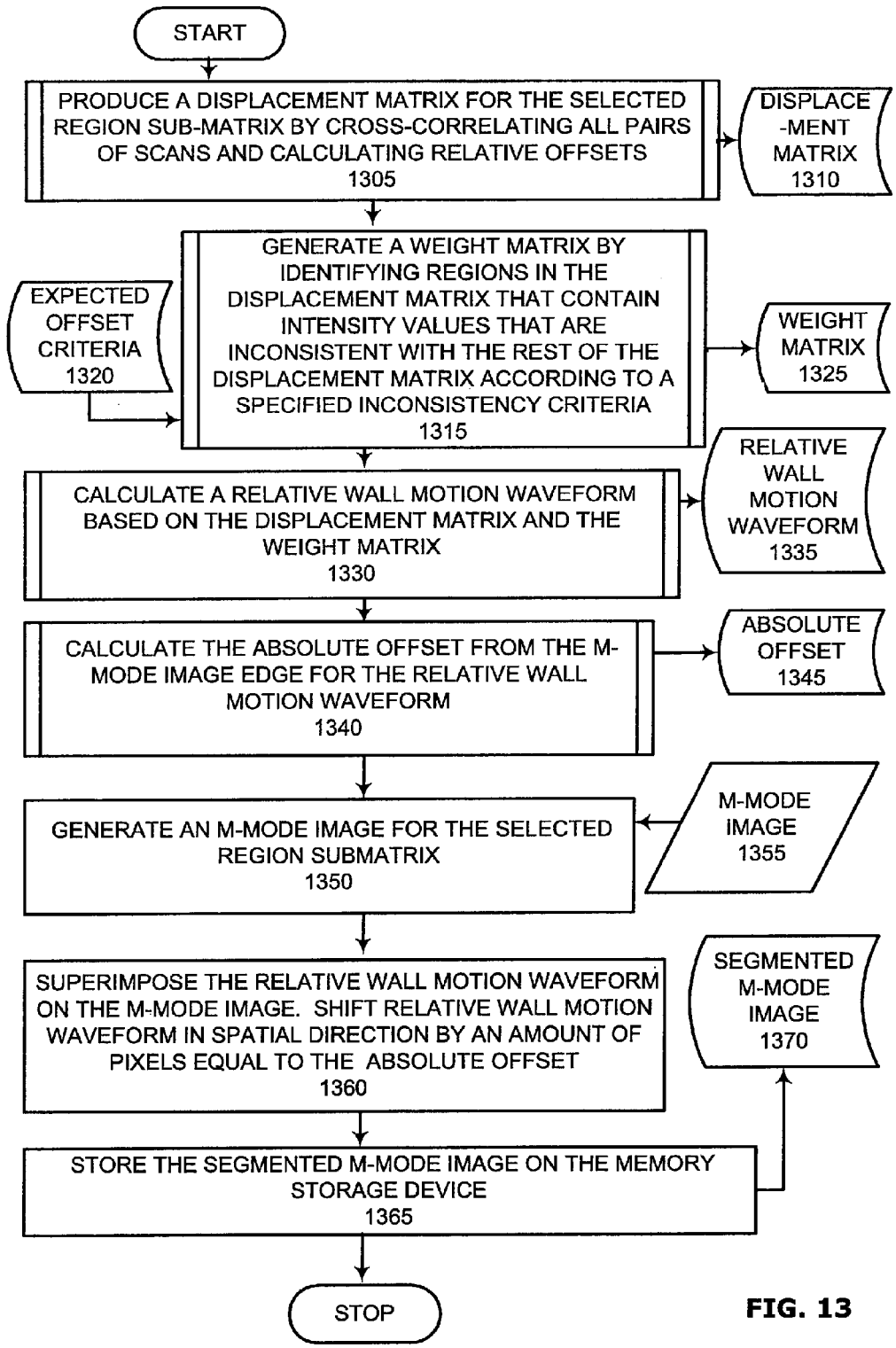
FIG. 13 shows in more detail the segmentation procedure performed by the segmentation program in FIG. 12 to segment each one of the sub matrices.

FIG. 13 shows in more detail the segmentation procedure performed by the segmentation program at step 1245 in FIG. 12 to segment each one of the sub matrices. As shown in FIG. 13, first, at step 1305, all pairs of scans in the selected region sub matrix are cross correlated with each other to calculate their relative offsets and to produce the displacement matrix 1310, an example of which is shown in FIG. 4. Typically, this step is performed by the scan correlator module of the segmentation program according to the equations (1)-(3) described above and the exemplary flows shown in FIGS. 14 and 15. Next, at step 1315, weight matrix 1325 is generated by identifying regions in the displacement matrix 1310 that contain intensity values that are inconsistent with the rest of the displacement matrix according to a specified expected offset criteria 1320. At steps 1330 and 1340, respectively, the relative wall motion waveform 1335 is generated by populating and executing Equations (4)-(8) above, and the absolute offset 1345 is calculated by finding the intersection of the threshold intensity value with the interpolated relative wall motion waveform. Optionally, the program causes the system to generate and store on the memory storage device a segmented m-mode image 1370 by retrieving a copy of the original m-mode image 1355, and then superimposing the relative wall motion waveform on the original m-mode image at a location that is offset in the spatial direction from the edge of the m-mode image by an amount equal to the absolute offset (steps 1350, 1360 and 1365).

Figure 14:
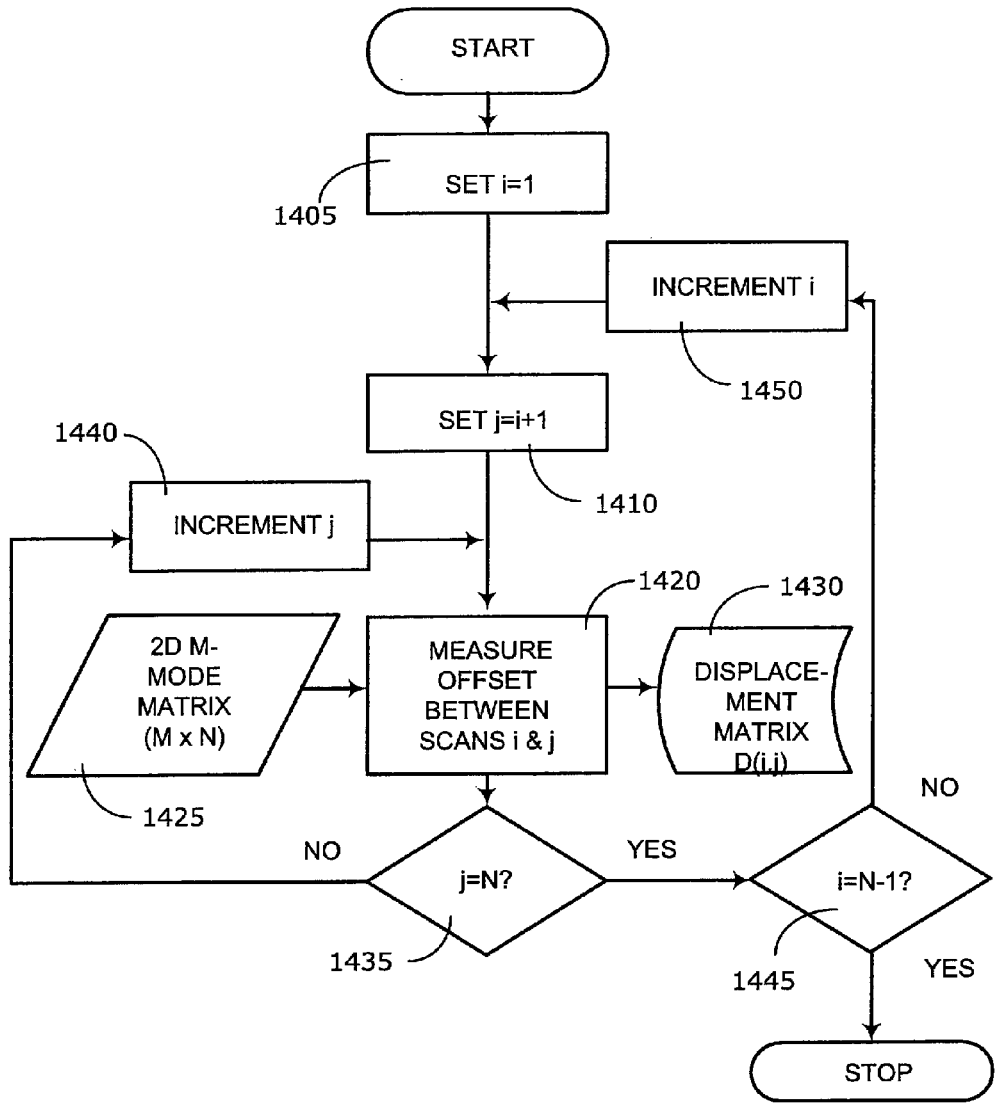
FIGS. 14 and 15 contain program flowcharts illustrating the steps performed by embodiments of the present invention to produce a displacement matrix (illustrated in FIG. 4).
Figure 15:
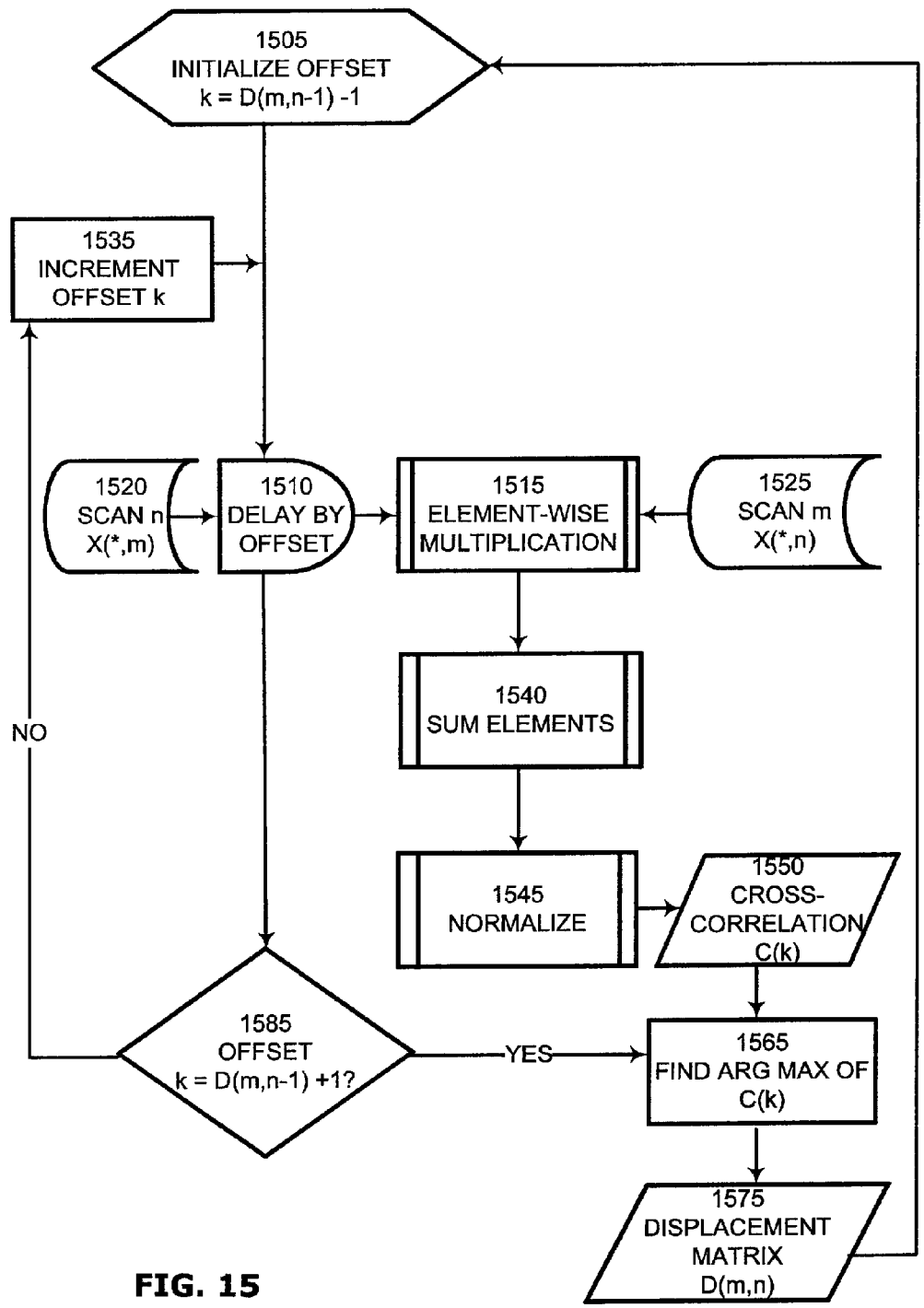

FIGS. 14 and 15 contain program flowcharts illustrating the steps performed by embodiments of the present invention to produce a displacement matrix (illustrated in FIG. 4) containing the relative offsets of all pairs of scans in the 2-D m-mode matrix (illustrated in FIG. 2). FIG. 14 shows a control algorithm built around the measuring step 1420 that compares each scan in the 2-D m-mode matrix to every other scan to calculate the relative offsets between all pairs of scans, while FIG. 15 shows a "sub algorithm" for actually carrying out the measuring step (step 1420) in FIG. 14.

As shown in FIG. 14, the process of generating the displacement matrix 1430 begins in steps 1405 and 1410 by initializing indexes i and j to correspond to the first and second scans in the 2-D m-mode matrix 1425. Then, in step 1420, the offset between scans i and j are measured and stored in the displacement matrix 1430. Then, in step 1435, the program determines whether scan j is the last scan in the 2-D m-mode matrix 1425. If the answer is no, then index j is incremented (step 1440) and processing returns to step 1420 again, wherein the offset between scan i and the new scan j is measured and stored in the displacement matrix 1430. If, however, it is determined in step 1435 that scan j is the last scan in the 2-D m-mode matrix, then the program next determines (in step 1445) whether scan i is the next-to-last scan in the 2-D m-mode matrix 1425. If the answer is yes, then all of the offsets for all pairs of scans have been measured and all of the cells of the displacement matrix 1430 have been filled, and processing of the displacement matrix 1430 is completed. However, if the answer in step 1445 is no, then index i is incremented (step 1450) and the processing returns to step 1410 to begin comparing the next scan to every other scan in the 2-D m-mode matrix 1425.

FIG. 15 shows in detail the steps some embodiments of the present invention may use to perform the step 1420 in FIG. 14 of measuring the offsets between scans i and j. Basically, for each pair of scans in the 2-D m-mode matrix, one scan is shifted with respect to the other, and all of the pixel intensity values in the first scan are multiplied against all the corresponding intensity values in the second scan (post-shift). Then the offset value that best aligns the scans as the peak value of the cross correlations is selected as the offset for that pair of scans. This process is then repeated for multiple shifts around an estimated expected offset value.

It is noted that the phrase "shift one scan with respect to the other" does not mean that the segmentation program, the scan correlator or the microprocessor in the computer system are actually physically shifting anything. Rather, the word "shift" is used to describe, in a visual sense, a process the segmentation program causes the computer system to carry out mathematically using arrays and indexes. FIG. 15 shows a flow diagram illustrating one way the offsets between pairs of scans m and n can be measured. This process may generally be described as follows: Starting with an array for scan i and a second array for scan i+1, multiply the pixel intensity value of position x in scan i against the pixel intensity value of position x+1 in scan i+1. Then repeat. While doing this, the program may be configured to throw out the high positions in scan i that do not have a counterpart position in scan i+1 due to the "shift," as well as the low positions in scan i+1 that no longer have a corresponding position in scan i, due to the shift. This shifting and multiplication process is carried out for every position in scans i and scan i+1, limited by the offset value derived and selected for the previous comparison, before selecting the offset that best aligns the scans as a peak value of the cross correlations. For every "shift," the computer processor (operating under the control of the segmentation program) saves the maximum (i.e., "peak") intensity value in a variable, and overwrites the saved maximum only when a higher intensity value (i.e., a new peak value) is derived from performing the multiplication steps in the current shift.

Figure 16:
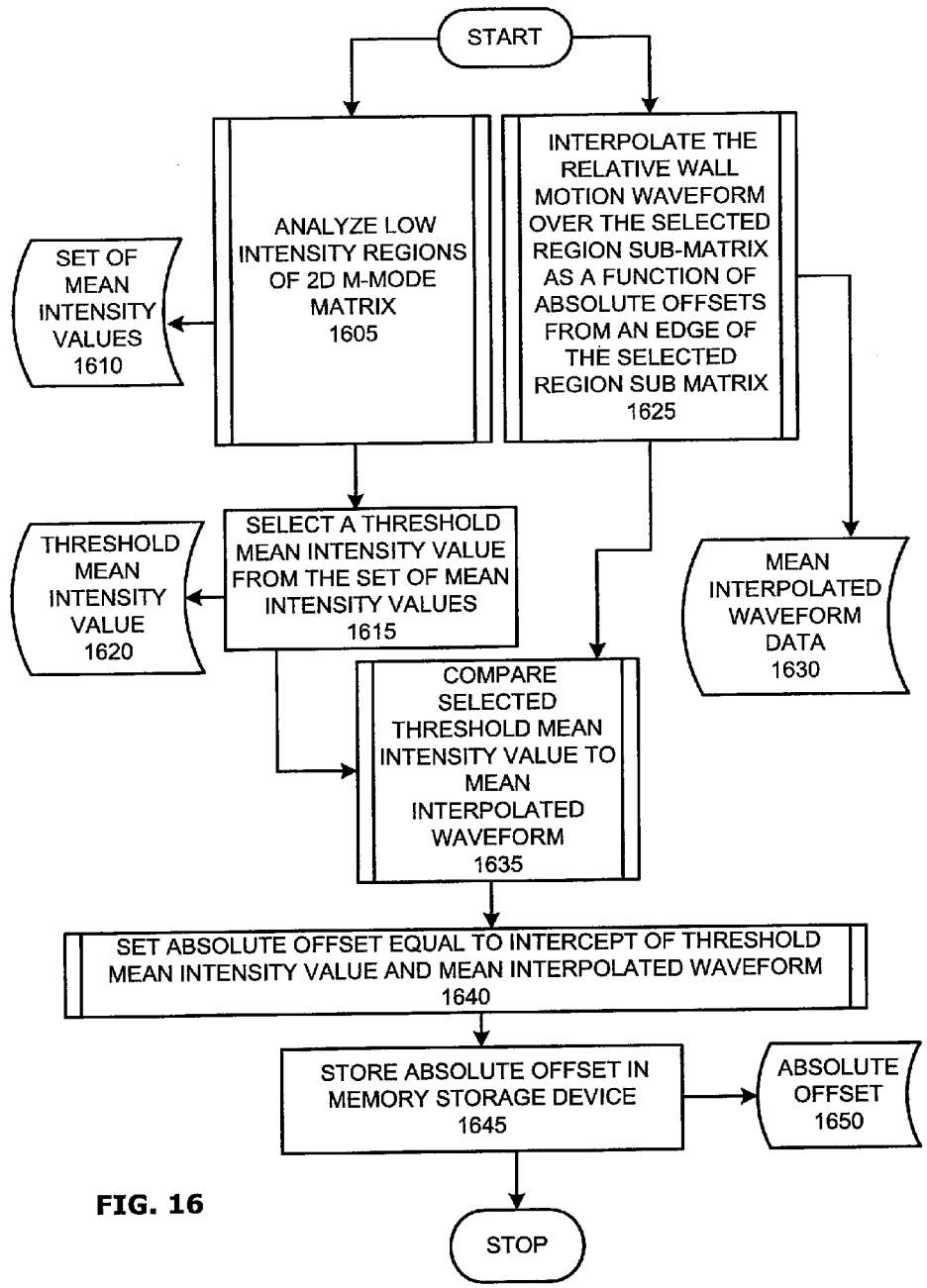
FIG. 16 shows a program flowchart illustrating the steps performed by embodiments of the invention to calculate the absolute offset from a relative wall motion waveform.

FIG. 16 shows a program flowchart illustrating the steps performed by embodiments of the invention to calculate the absolute offset from a relative wall motion waveform. As shown in FIG. 16, the calculation process involves analyzing the low intensity regions of the 2-D m-mode matrix (steps 1605 and 1615) to select a threshold mean intensity value 1620, interpolating the relative wall motion waveform over the selected region sub matrix as a function of absolute offsets from an edge of the sub matrix (step 1625), comparing the threshold to the interpolated waveform (step 1635) and setting the absolute offset equal to the intercept of the threshold and the mean interpolated waveform (step 1640). The absolute offset 1650 is then stored on the memory storage device for later use (step 1645).

Figure 17:
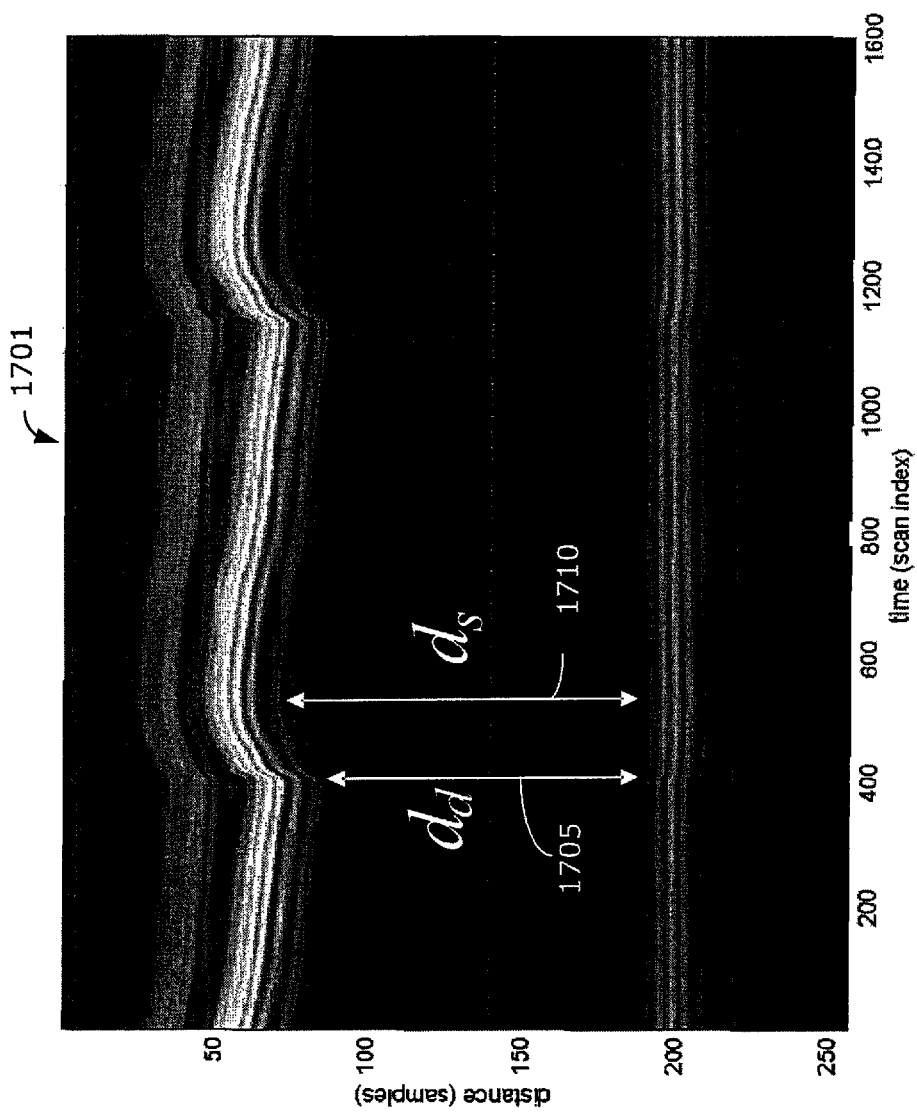
FIG. 17 shows a segmented m-mode image that might be produced by one embodiment of the present invention.

FIG. 17 shows a segmented m-mode image 1701 that might be produced by the present invention, wherein a diastolic diameter marker 1705 and the systolic diameter 1710 of the blood wall, as determined from the distance from the absolute waveforms for the anterior wall and the posterior wall, are superimposed over the m-mode ultrasound image.

Applications in Pharmaceutical Research and Development

The m-mode images and the measurements obtained using the methodology described herein are especially useful for testing potential new drug candidates in preclinical studies using animal models for various diseases that occur in other animals and humans, but primarily in humans. Thus, compounds can be tested for safety and/or therapeutic efficacy in the treatment of a disease, wherein the disease or condition affects the motions of the walls of blood vessels of an animal model, comprising the steps of (1) administering a measured sample of the compound being tested to the animal model for the disease; and (2) measuring hemodynamic biomarkers for the disease in a blood vessel, where the hemodynamic biomarkers are measured or calculated or imaged by M-mode ultrasound using the computer program, the computer program product, and the methodology as described herein. The hemodynamic biomarkers for example may be distension or strain, calculated using the high-resolution vessel diameter waveform. The hemodynamic biomarker can be a measure of vessel stiffness or energy loss, calculated from a combination of the high-resolution vessel diameter and a simultaneous measurement of blood pressure. The hemodynamic biomarker may also be calculated from distension, strain, and compliance. The preclinical studies may be carried out for example to test new drug candidates for diseases of the cardiovascular system, such as atherosclerosis and hypertension. The number of drug candidates that can be tested using this methodology is much higher than the commonly used studies that are carried out on animal models for a period of time that is sufficient to observe the effects of the drug on the animal using such techniques as analysis of biochemical markers in serum or blood and analysis of tissue.

Vascular wall abnormalities such as arterial stiffness may indicate early vascular changes that predispose a patient to the development of major vascular disease. The repeatability of a variety of indices of arterial stiffness calculated from carotid arterial M-mode ultrasound images have been investigated. Estimates of carotid artery distension and cross-sectional compliance derived from M-mode ultrasound recordings are moderately reproducible and thus may provide useful end points for trials of atherosclerotic progression and differentiation of hypertension in tests of new compounds or for new indications. There are a number of treatable disease states where changes in vascular health may be an indicator of disease. These include (congestive) heart failure, congenital heart disease, metabolic disorder, endothelial dysfunction, hypertension, atherosclerosis, diabetes, obesity, metabolic disorders, vascular inflammation and other pathophysiological conditions of the large and small vessels.

The automated high-resolution M-mode computer processing system is pivotal to using M-mode in a high-throughput, drug development context. The M-mode computer system is used in conjunction with animal models and designed experiments to create a disease therapeutic window that allows for quantitative discrimination of arterial stiffness as a disease. An animal model is a species or genetic strain whose blood vessel wall motion is known to be affected by a disease state that also occurs in humans. The disease may be induced by genetic modifications, chemical compounds, aging, diet, and other methods. Biomechanical properties may be distinct or observable earlier than the standard circulating biomarkers that are considered to be the standard biomarkers for morbidity and mortality. The automated high-resolution M-mode system creates the added value of detecting small changes in vascular wall stiffness in multiple animal models, enabling better differential assessment of compound efficacy.

In the preclinical drug-discovery setting, M-mode imaging is conducted with a device, like the VisualSonics Vevo 770 or 2100, with a high resolution probe and parasternal scanning of multiple vascular beds. Longitudinal studies over time, from acute studies on the order of hours, to chronic studies on the order of weeks or months, provide an increased sensitivity of compound efficacy and disease progression, thus quantifying the trend in wall dynamics changes and increasing statistical power. Once the animal model is established, baseline scans are conducted in the null-disease and/or compound state, followed by additional scans at differing timepoints to monitor disease progression and/or compound efficacy. For each scan, the M-mode scan location is registered against internal anatomical landmarks, to insure region specificity and repeatability. Scans are conducted for a minimum of 50 cardiac cycles, and smaller groupings on the order of 3-5 cardiac cycles are used for the M-mode system quantification. These groupings are selected to eliminate or reduce respiratory interference, leaving normal cardiac rhythms of the vascular wall.

In the clinical setting, physiological and pathophysiological vascular wall motion may predict for example, early changes in health and may be diagnostic of long term outcomes. Further, unlike more static biomarkers, these dynamic assessments of the wall behavior reflect the intermediate cumulative effects that lead to CVD co-morbidities.

The high-resolution vessel wall diameter waveform enables the measurement of a number of biomarkers. Traditionally, vessel wall biomarkers have used only the systolic (maximum) and diastolic (minimum) points of the diameter waveform, each of which occur only once per cardiac cycle. Examples are distension (absolute change in diameter between diastolic and systolic), and strain (relative change in diameter between diastolic and systolic). When combined with a simultaneous and synchronized blood pressure measurement, obtained either invasively or non-invasively, an estimate of vessel stiffness can be calculated. There are several different measures of vessel stiffness, all based on pressure and diameter measurements, but differing in normalization. For example, compliance is a measure of the change in vessel diameter (distension) per change in pressure. Even for these traditional biomarkers, the high-resolution, sub-pixel resolution of the M-mode system is advantageous, in that the diameter measurements obtained at the systolic and diastolic extrema are also at sub-pixel resolution.

However, traditional biomarkers only represent the dynamics at systole and diastole, ignoring the full trajectory throughout the cardiac cycle, which may contain a much richer set of information. When a simultaneous measurement of pressure is not available, the high-resolution diameter waveform can be used to estimate the pressure waveform at the same location, by assuming a mathematical model for the relationship. The simplest model is that of Hooke's law, which assumes the vessel wall acts like a spring with a restoring force proportional to distension. Once a pressure waveform is obtained in this way, pressure biomarkers that use the entire waveform can be calculated, such as mean arterial pressure (MAP, the integral of the pressure waveform over one cardiac cycle), Buckberg index (the ratio of MAP within the diastolic part of the cycle to the MAP within the systolic part of the cycle), or augmentation index.

When a simultaneous measurement of pressure is available, the complete dynamics of the vessel wall are captured. This information is aptly portrayed in the pressure-area loop. The trajectory in state space obtained by plotting pressure vs. lumen area (calculated from the diameter) is referred to as a pressure-area (PA) loop. The shape of the PA loop is determined by several factors, such as the shape of the pressure pulse, and mechanical properties of the wall, such as compliance and viscosity. For conduit arteries, mechanical energy of the wall is either conserved or dissipated as heat. For a purely elastic wall, the PA loop will traverse a straight line, with the inverse slope of the line given by the compliance. For the visco-elastic case, the wall stores more energy than it releases, and the PA loop traverses a clockwise path. The area within the PA loop is a measure of energy dissipated within the wall during a cardiac cycle, which affects the efficiency with which blood is pumped downstream. The inverse slope of the PA loop at any time is an instantaneous measure of compliance.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the structures and the combination of the individual elements may be resorted to without departing from the spirit and scope of the invention.

What is claimed is:

1. A computer system for segmenting an m-mode ultrasound image of a blood vessel, comprising:
(A) a microprocessor;
(B) a computer-readable memory storage device;
(C) a prerecorded m-mode data file, stored on the memory storage device, comprising pixel intensity values for a collection of sequentially-recorded ultrasound scans of the blood vessel, each scan indicating the positions of boundaries within the blood vessel at the time said each scan was recorded, including boundaries associated with an anterior wall of said blood vessel and boundaries associated with a posterior wall of said blood vessel;
(D) a matrix generator, encoded on the memory storage device, comprising computer-readable instructions to cause the microprocessor to generate and store on the memory storage device a two-dimensional m-mode matrix comprising the pixel intensity values, wherein the computer-readable instructions are configured to cause the microprocessor to parse the prerecorded m-mode data file according to a predefined file format specification;
(E) a matrix splitter, encoded on the memory storage device, comprising computer-readable instructions to cause the microprocessor to generate and store on the memory storage device an anterior wall region sub matrix and a posterior wall region sub matrix, wherein said anterior wall region sub matrix comprises the portion of the two-dimensional m-mode matrix containing the boundaries associated with the anterior wall, and said posterior wall region sub matrix comprises the portion of the two-dimensional m-mode matrix containing the boundaries associated with the posterior wall;
(F) a scan correlator, encoded on the memory storage device, comprising computer-readable instructions to cause the microprocessor to
(i) select a region sub matrix, and
(ii) produce and store on the memory storage device a displacement matrix for the selected region sub matrix by executing a cross-correlation function on all pairs of scans in said selected region sub matrix and calculating the relative offset between said all pairs of scans as an index to a peak of the executed cross-correlation function;
(G) a relative wall motion waveform calculator, encoded on the memory storage device, comprising computer-readable instructions to cause the microprocessor to calculate and store on the memory storage device a relative wall motion waveform for an intima-lumen boundary in the selected region sub-matrix based on the displacement matrix; and (H) an absolute offset calculator, encoded on the memory storage device, comprising computer-readable instructions to cause the microprocessor to calculate and store on the memory storage device an absolute offset for the relative wall motion waveform.

2. The computer system of claim 1, further comprising an image generator, encoded on the memory storage device, comprising computer-readable instructions configured to cause the microprocessor to produce and store on the memory storage device a segmented m-mode image illustrating an absolute wall motion waveform for the intima-lumen boundary, wherein said segmented m-mode image comprises a graphical illustration of the relative wall motion waveform superimposed on a graphical illustration of the selected region sub matrix, and said relative wall motion waveform graphical illustration is positioned at a location that is shifted in the spatial direction from an edge of said selected region sub matrix graphical illustration by an amount equal to the absolute offset.

3. The computer system of claim 2, further comprising an output device, operable with the microprocessor, the memory storage device and the image generator, to render a human-readable version of the segmented image.

4. The computer system of claim 1, further comprising:
(I) an offset error detector, encoded on the memory storage device, comprising computer-readable instructions to cause the microprocessor to automatically detect outlier regions in the displacement matrix, said outlier regions having boundaries containing pixel intensity values that are inconsistent with the rest of the displacement matrix according to a specified inconsistency criteria;
(J) wherein said offset detector includes computer-readable instructions to cause the microprocessor to generate and store on the memory storage device a weight matrix containing values that identify the outlier regions in the displacement matrix; and
(K) wherein the relative wall motion waveform calculator is further configured to calculate the relative wall motion waveform based on both the displacement matrix and said weight matrix.

5. The computer system of claim 4, wherein the specified inconsistency criteria comprises a difference greater than one pixel between the offset values of two neighboring cells in the displacement matrix.

6. The computer system of claim 1, further comprising:
(L) an interpolator, encoded on the memory storage device, comprising computer-readable instructions that, when processed by the microprocessor, will cause the microprocessor to automatically produce a mean interpolated waveform by interpolating the relative wall motion waveform over the selected region sub matrix as a function of a plurality of absolute offsets in the spatial direction from an edge of the selected sub matrix; and
(M) a threshold calculator, encoded on the memory storage device, comprising computer-readable instructions to cause the microprocessor to automatically select a threshold mean intensity value from a set of mean intensity values in the two-dimensional m-mode matrix;
(N) wherein the absolute offset calculator further includes computer-readable instructions to cause the microprocessor to automatically (i) compare the selected threshold mean intensity value and the mean interpolated waveform, and (ii) set the absolute offset equal to the intercept of the selected threshold mean intensity value and the mean interpolated waveform.

7. The computer system of claim 6, wherein the set of mean intensity values is derived from a statistical analysis of low intensity values in the two-dimensional m-mode matrix.

8. The computer system of claim 1, further comprising an absolute distension calculator, comprising computer-readable instructions to cause the microprocessor to automatically calculate and store on the memory storage device a distension for the blood vessel by (i) calculating a diastolic diameter based on a minimum separation between an absolute wall motion waveform for said anterior wall and an absolute wall motion waveform for said posterior wall, (ii) calculating a systolic diameter based on a maximum separation between said anterior wall absolute wall motion waveform and said posterior wall absolute wall motion waveform, and (iii) subtracting said diastolic diameter from said systolic diameter.

9. The computer system of claim 8, wherein the segmented image created by the image generator and the microprocessor further includes markers indicating the diastolic diameter and the systolic diameter.

10. A method for segmenting an m-mode ultrasound image of a blood vessel using a microprocessor, a computer-readable memory storage device, and a segmentation program comprising a plurality of program modules encoded in the computer-readable memory storage device, said plurality of program modules having computer-readable instructions for controlling the microprocessor, the method comprising:
(A) storing a prerecorded m-mode data file on the memory storage device, the prerecorded m-mode data file comprising pixel intensity values for a collection of sequentially-recorded ultrasound scans of the blood vessel, each scan indicating the positions of boundaries within the blood vessel at the time said each scan was recorded, including boundaries associated with an anterior wall of said blood vessel and boundaries associated with a posterior wall of said blood vessel;
(B) using the segmentation program to cause the microprocessor to generate and store on the memory storage device a two-dimensional m-mode matrix comprising the pixel intensity values, wherein the segmentation program includes a program module having computer-readable instructions configured to cause the microprocessor to parse the prerecorded m-mode data file according to a predefined file format specification;
(C) using the segmentation program to cause the microprocessor to produce and store on the memory storage device an anterior wall region sub matrix and a posterior wall region sub matrix, said anterior wall region sub matrix comprising a portion of the two-dimensional m-mode matrix containing the anterior wall boundary, and said posterior wall region sub matrix comprising a portion of the two-dimensional m-mode matrix containing the posterior wall boundary;
(D) using the segmentation program and the microprocessor to automatically select one of said region sub matrices for segmentation;
(E) using the segmentation program to cause the microprocessor to produce and store on the memory storage device a displacement matrix for the selected region sub matrix by executing a cross-correlation function on all pairs of scans in said selected region sub matrix and calculating the relative offset between said all pairs of scans as an index to a peak of the executed cross-correlation function;
(F) using the segmentation program to cause the microprocessor to calculate and store on the memory storage device a relative wall motion waveform for an intima-lumen boundary in the selected region sub matrix based on the displacement matrix; and (G) using the segmentation program to cause the microprocessor to calculate and store on the memory storage device an absolute offset for the relative wall motion waveform.

11. The method of claim 10, further comprising using the segmentation program to cause the microprocessor to produce and store on the memory storage device a segmented m-mode image illustrating an absolute wall motion waveform for the intima-lumen boundary, wherein said segmented m-mode image comprises a graphical illustration of the relative wall motion waveform superimposed on a graphical illustration of the selected region sub matrix, and said relative wall motion waveform graphical illustration is positioned at a location that is shifted in the spatial direction from an edge of said selected region sub matrix graphical illustration by an amount equal to the absolute offset.

12. The method of claim 11, further comprising using the segmentation program, the microprocessor and the memory storage device to produce a human-readable version of the segmented m-mode image on an output device.

13. The method of claim 10, further comprising:
(H) using the segmentation program and the microprocessor to automatically select another one of said region sub matrices for segmentation; and
(I) repeating steps E through G above to produce and store on the memory storage device a second relative wall motion waveform for a second intima-lumen boundary, and a second absolute offset for the second relative wall motion waveform.

14. The method of claim 13, further comprising using the segmentation program and the microprocessor to produce a second segmented m-mode image, the second segmented m-mode image illustrating a second absolute wall motion waveform for the second intima-lumen boundary, wherein said second segmented m-mode image comprises a graphical illustration of the second relative wall motion waveform superimposed on the graphical illustration of the selected region sub matrix, wherein said second relative wall motion waveform is positioned at a location that is offset in the spatial direction from an edge of said selected region sub matrix graphical illustration by an amount equal to the second absolute offset.

15. The method of claim 10, further comprising:
(J) using the segmentation program and the microprocessor to automatically generate and store on the memory storage device a weight matrix, wherein the segmentation program includes a program module that causes the microprocessor to automatically detect outlier regions in the displacement matrix, said outlier regions having boundaries containing pixel intensity values that are inconsistent with the rest of the displacement matrix according to a specified inconsistency criteria; and
(K) using the segmentation program and the microprocessor to calculate the relative wall motion waveform based on both the displacement matrix and said weight matrix.

16. The method of claim 15, wherein the specified inconsistency criteria comprises a difference greater than one pixel between the offset values of two neighboring cells in the displacement matrix.

17. The method of claim 10, further comprising using the segmentation program and the microprocessor to automatically
(L) produce a mean interpolated waveform, wherein the segmentation program includes a program module having computer-readable instructions to cause the microprocessor to automatically interpolate the relative wall motion waveform over the selected region sub matrix as a function of a plurality of absolute offsets in the spatial direction from an edge of the selected region sub matrix;
(M) select a threshold mean intensity value from a set of mean intensity values in the two-dimensional m-mode matrix;
(N) compare the selected threshold mean intensity value and the mean interpolated waveform; and
(O) set the absolute offset equal to the intercept of the selected threshold mean intensity value and the mean interpolated waveform.

18. The method of claim 17, further comprising deriving the set of mean intensity values from a statistical analysis of low intensity values in the two-dimensional m-mode matrix.

19. The method of claim 10, further comprising using the segmentation program and the microprocessor to automatically calculate and store on the memory storage device a distension for the blood vessel by (i) calculating a diastolic diameter based on a minimum separation between an absolute wall motion waveform for said anterior wall and an absolute wall motion waveform for said posterior wall, (ii) calculating a systolic diameter based on a maximum separation between said anterior wall absolute wall motion waveform and said posterior wall absolute wall motion waveform, and (iii) subtracting said diastolic diameter from said systolic diameter.

20. The method of claim 19, further comprising using the segmentation program and the microprocessor to superimpose on the segmented m-mode image a set of markers indicating the diastolic diameter and the systolic diameter.

21. A computer program product, comprising a computer usable medium having computer-readable program code embodied therein, said computer-readable program code adapted to be executed by a microprocessor to implement a method for segmenting an m-mode ultrasound image of a blood vessel, wherein said computer readable medium is selected from the group consisting of memory, hard disks, DVD-ROMs, CD-ROMs, floppy disks, magnetic tape, flash memory cards, and firmware or microcode in one or more sets of ROM, RAM or PROM chips, as an Application Specific Integrated Circuit (ASIC), wherein the method comprises:

(A) storing a prerecorded m-mode data file in a memory storage device, the prerecorded m-mode data file comprising pixel intensity values for a collection of sequentially-recorded ultrasound scans of the blood vessel, each scan indicating the positions of boundaries within the blood vessel at the time said each scan was recorded, including boundaries associated with an anterior wall of said blood vessel and boundaries associated with a posterior wall of said blood vessel;

(B) generating and storing on the memory storage device a two-dimensional m-mode matrix comprising the pixel intensity values, wherein the microprocessor parses the prerecorded m-mode data file according to a predefined file format specification;

(C) producing and store on the memory storage device an anterior wall region sub matrix and a posterior wall region sub matrix, said anterior wall region sub matrix comprising a portion of the two-dimensional m-mode matrix containing the anterior wall boundary, and said posterior wall region sub matrix comprising a portion of the two-dimensional m-mode matrix containing the posterior wall boundary;

(D) automatically selecting one of said region sub matrices for segmentation;

(E) producing and storing on the memory storage device an displacement matrix for the selected region sub matrix by executing a cross-correlation function on all pairs of scans in said selected region sub matrix and calculating the relative offset between said all pairs of scans as an index to a peak of the executed cross-correlation function;

(F) calculating and storing on the memory storage device a relative wall motion waveform for an intima-lumen boundary in the selected region sub matrix based on the displacement matrix; and (G) calculating and storing on the memory storage device an absolute offset for the relative wall motion waveform.

22. The computer program product of claim 21, further comprising program code adapted to cause the microprocessor to produce and store on the memory storage device a segmented m-mode image illustrating an absolute wall motion waveform for the intima-lumen boundary, wherein said segmented m-mode image comprises a graphical illustration of the relative wall motion waveform superimposed on a graphical illustration of the selected region sub matrix, and said relative wall motion waveform graphical illustration is positioned at a location that is shifted in the spatial direction from an edge of said selected region sub matrix graphical illustration by an amount equal to the absolute offset.

23. The computer program product of claim 22, further comprising program code adapted to cause the microprocessor to retrieve the segmented m-mode image from the memory storage device and to produce a human-readable version of the segmented m-mode image on an output device.

24. The computer program product of claim 21, further comprising program code adapted to cause the microprocessor to automatically:

(H) select another one of said region sub matrices for segmentation; and (I) repeat steps E through G above to produce and store on the memory storage device a second relative wall motion waveform for a second intima-lumen boundary, and a second absolute offset for the second relative wall motion waveform.

25. The computer program product of claim 24, further comprising program code adapted to cause the microprocessor to produce a second segmented m-mode image, the second segmented m-mode image illustrating a second absolute wall motion waveform for the second boundary, wherein said second segmented m-mode image comprises a graphical illustration of the second relative wall motion waveform superimposed on the graphical illustration of the selected region sub matrix, and the second relative wall motion waveform is positioned at a location that is shifted in the spatial direction from an edge of said selected region sub matrix graphical illustration by an amount equal to the second absolute offset.

26. The computer program product of claim 21, further comprising program code adapted to cause the microprocessor to automatically:

(I) generate and store on the memory storage device a weight matrix, wherein the computer program includes a program module that causes the microprocessor to automatically detect outlier regions in the displacement matrix, said outlier regions having boundaries containing pixel intensity values that are inconsistent with the rest of the displacement matrix according to a specified inconsistency criteria; and (J) calculate the relative wall motion waveform based on both the displacement matrix and said weight matrix.

27. The computer program product of claim 26, wherein the specified inconsistency criteria comprises a difference greater than one pixel between the offset values of two neighboring cells in the displacement matrix.

28. The computer program product of claim 21, further comprising program code adapted to cause the microprocessor to automatically:

(I) produce a mean interpolated waveform by interpolating the relative wall motion waveform over the selected region sub matrix as a function of a plurality of absolute offsets in the spatial direction from an edge of the selected region sub matrix;

(J) select a threshold mean intensity value from a set of mean intensity values in the two-dimensional m-mode matrix;

(K) compare the selected threshold mean intensity value and the mean interpolated waveform; and (L) set the absolute offset equal to the intercept of the selected threshold mean intensity value and the mean interpolated waveform.

29. The computer program product of claim 28, further comprising program code adapted to cause the microprocessor to automatically derive the set of mean intensity values from a statistical analysis of low intensity values in the two-dimensional m-mode matrix.

30. The computer program product of claim 21, further comprising program code adapted to cause the microprocessor to automatically calculate and store on the memory storage device a distension for the blood vessel by (i) calculating a diastolic diameter based on a minimum separation between an absolute wall motion waveform for said anterior wall and an absolute wall motion waveform for said posterior wall, (ii) calculating a systolic diameter based on a maximum separation between said anterior wall absolute wall motion waveform and said posterior wall absolute wall motion waveform, and (iii) subtracting said diastolic diameter from said systolic diameter.

31. The computer program product of claim 30, further comprising program code adapted to cause the microprocessor to superimpose on the segmented m-mode image a set of markers indicating the diastolic diameter and the systolic diameter.

* * * * *